United States Patent
Barta et al.

(10) Patent No.: US 7,107,136 B2
(45) Date of Patent: Sep. 12, 2006

(54) VEHICLE ROLLOVER DETECTION AND MITIGATION USING ROLLOVER INDEX

(75) Inventors: David John Barta, Beauercreek, OH (US); Aleksander Boguslaw Hac, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 426 days.

(21) Appl. No.: 10/229,367

(22) Filed: Aug. 27, 2002

(65) Prior Publication Data

US 2003/0055549 A1 Mar. 20, 2003

Related U.S. Application Data

(60) Provisional application No. 60/315,590, filed on Aug. 29, 2001.

(51) Int. Cl.
*B60T 8/60* (2006.01)
*G06F 7/00* (2006.01)

(52) U.S. Cl. .............................. 701/70; 701/1; 180/271; 280/755

(58) Field of Classification Search ................... 701/70, 701/36, 37, 38, 1; 340/429, 440; 180/271, 180/282; 280/755

See application file for complete search history.

(56) References Cited

U.S. PATENT DOCUMENTS

| | | | |
|---|---|---|---|
| 5,869,943 A | 2/1999 | Nakashima et al. | |
| 6,038,495 A * | 3/2000 | Schiffmann | 701/1 |
| 6,065,558 A | 5/2000 | Wielenga | |
| 6,179,394 B1 | 1/2001 | Browalski et al. | |
| 6,192,305 B1 * | 2/2001 | Schiffmann | 701/45 |
| 6,263,261 B1 | 7/2001 | Brown et al. | 701/1 |
| 6,301,536 B1 | 10/2001 | Vaessen et al. | |
| 6,324,446 B1 | 11/2001 | Brown et al. | 701/1 |
| 6,332,104 B1 | 12/2001 | Brown et al. | 701/1 |
| 6,338,012 B1 | 1/2002 | Brown et al. | 701/1 |
| 6,496,758 B1 | 12/2002 | Rhode et al. | |
| 6,529,803 B1 | 3/2003 | Meyers et al. | |
| 6,529,811 B1 | 3/2003 | Watson et al. | |
| 6,535,800 B1 | 3/2003 | Wallner | |
| 6,542,073 B1 | 4/2003 | Yeh et al. | |
| 6,542,792 B1 * | 4/2003 | Schubert et al. | 701/1 |
| 6,560,519 B1 | 5/2003 | Williams et al. | |
| 6,584,388 B1 * | 6/2003 | Schubert et al. | 701/46 |
| 6,654,674 B1 | 11/2003 | Lu et al. | |

* cited by examiner

Primary Examiner—William A. Cuchlinski, Jr.
Assistant Examiner—Olga Hernandez
(74) Attorney, Agent, or Firm—Michael D. Smith

(57) ABSTRACT

A method and apparatus for determining likelihood of rollover of a vehicle and/or mitigating rollover of the vehicle is responsive to measured vehicle lateral acceleration and a measured one of vehicle roll rate and vehicle suspension displacements to derive estimates of roll angle and roll rate. First, preliminary, estimates of roll angle and roll rate are derived and used as pseudo-measurements in a dynamic, closed loop observer equation which represents a model of the vehicle in a first roll mode for roll angles small compared to a reference value indicating two wheel lift-off and a second roll mode for roll angles at least near a reference value indicating two wheel lift-off. The observer equation has parameters and gains with values for each mode stored as a function of roll angle index derived from measurements and pseudo-measured values. The observer equation produces second, improved values or roll angle and roll rate together indicating the likelihood of vehicle rollover. Rollover mitigating controls for brakes, active front steer, and/or active rear steer are also disclosed.

24 Claims, 13 Drawing Sheets

VEHICLE ROLLOVER DETECTION AND MITIGATION USING ROLLOVER INDEX

RELATED APPLICATIONS

Reference is made to U.S. Provisional Application No. 60/315,590, filed Aug. 29, 2001, the disclosure of which is incorporated by reference herein.

TECHNICAL FIELD

The technical field of this invention is the detection and/or mitigation of vehicle rollover.

BACKGROUND OF THE INVENTION

An aspect of vehicle handling receiving increased recent attention is vehicle rollover. Some recently produced or proposed active chassis control systems have sufficient control authority (in terms of ability to affect vehicle path or roll angle) to be potentially useful in preventing some types of rollovers. To prevent rollovers, these systems need to be activated when the roll angle is relatively small, roughly corresponding to the two wheel lift off condition. In order for these systems to operate properly, it is advantageous to know the roll angle, as well as roll rate, of the vehicle body with respect to the road. While the absolute roll rate can be measured directly by a sensor, the roll angle and, to a lesser extent, roll rate with respect to the road need to be estimated. Algorithms exist for predicting impending rollover by estimating roll angle for the purpose of deploying supplementary restraint systems (e.g. side curtains or side airbags). But these algorithms are designed to predict roll angles close to the critical value, corresponding to a static marginally stable condition, which is about 45 degrees. They may not be accurate for roll angle magnitudes in the range of approximately 5 to 20 degrees, which is of primary interest in rollover prevention.

SUMMARY OF THE INVENTION

The invention is a method and apparatus for determining likelihood of rollover of a vehicle wherein vehicle lateral acceleration is measured as well as one of vehicle roll rate and the vehicle suspension displacements. From the measured vehicle lateral acceleration and the measured one of the vehicle roll rate and the vehicle suspension displacements a first estimate of roll angle and a first estimate of roll rate are derived.

A dynamic, closed loop observer equation is stored. The observer equation is a model of the vehicle in a first roll mode for roll angles small compared to a reference value indicating two wheel lift-off and a second roll mode for roll angles at least near a reference value indicating two wheel lift-off. The observer equation has a plurality of terms with coefficients, and values of the coefficients of selected ones of the plurality of terms of the observer equation are stored as functions of the roll angle index. The stored coefficients for each of the selected ones of the plurality of terms have at least a first value corresponding to the first roll mode and a second value corresponding to the second roll mode.

A roll angle index is derived from at least the measured lateral acceleration and the measured one of vehicle roll rate and vehicle suspension displacements, and a second estimate of roll angle is derived from the observer equation using one of the first values of the stored coefficients and the second values of the stored coefficients based on the derived roll angle index. The likelihood of vehicle roll-over is determined at least in response to the second estimate of roll angle.

In a preferred embodiment of the invention, a second estimate of roll rate is preferably derived from the observer equation using the one of the first values of the stored coefficients and the second values of the stored coefficients based on the derived roll angle index; and the likelihood of vehicle roll-over is further determined in response to the second estimate of roll rate.

In a preferred embodiment of the invention wherein the measured one of vehicle roll rate and the vehicle suspension displacements is the vehicle roll rate, a measured and centered roll rate substantially free of the effects of slowly changing bank angle of the road and sensor bias is preferably derived from the measured vehicle roll rate. To obtain the measured and centered roll rate, a preliminary estimate of roll angle from lateral acceleration may be derived from the measured lateral acceleration, and therefrom a preliminary estimate of roll rate from lateral acceleration may be derived. A roll rate error representing the effect of sensor bias and slowly changing bank angle may be derived by limiting and filtering the difference between the preliminary estimate of roll rate from lateral acceleration and the measured vehicle roll rate. Finally, the measured and centered roll rate, substantially free of the effects of sensor bias and slowly changing bank angle, may be derived as the difference between the measured and centered roll rate and the measured vehicle roll rate. A preliminary estimate of roll angle from roll rate may be derived from the measured and centered roll rate.

The first estimate of roll angle may be derived as a weighted combination of the preliminary estimate of roll angle from lateral acceleration and the preliminary estimate of roll angle from roll rate. A weighting factor is derived from the measured vehicle roll rate; and the first estimate of roll angle is calculated as a weighted sum of the preliminary estimate of roll angle from lateral acceleration and the preliminary estimate of roll angle from roll rate, using a value of the weighting factor determined by the measured vehicle roll rate. The weighting factor preferably provides greater weight to the preliminary estimate of roll angle derived from the measured lateral acceleration at small values of the measured vehicle roll rate and greater weight to the preliminary estimate of roll angle derived from the measured vehicle roll rate at larger values of the measured roll rate.

If the measured one of vehicle roll rate and vehicle suspension displacements is the vehicle roll rate, the roll angle index is preferably derived from one of the preliminary estimate of roll angle from lateral acceleration and a composite term comprising at least the preliminary estimate of roll angle from roll rate and the measured vehicle lateral acceleration. The composite term preferably further comprises the measured and centered roll rate. If the measured one of vehicle roll rate and vehicle suspension displacements is the suspension displacements, the roll angle index is preferably derived from one of the measured lateral acceleration and a preliminary estimate of roll angle from suspension displacements.

BRIEF DESCRIPTION OF THE DRAWINGS

The present invention will now be described, by way of example, with reference to the accompanying drawings, in which.

DESCRIPTION OF THE PREFERRED EMBODIMENT

Fundamental Principals

Figure 1:
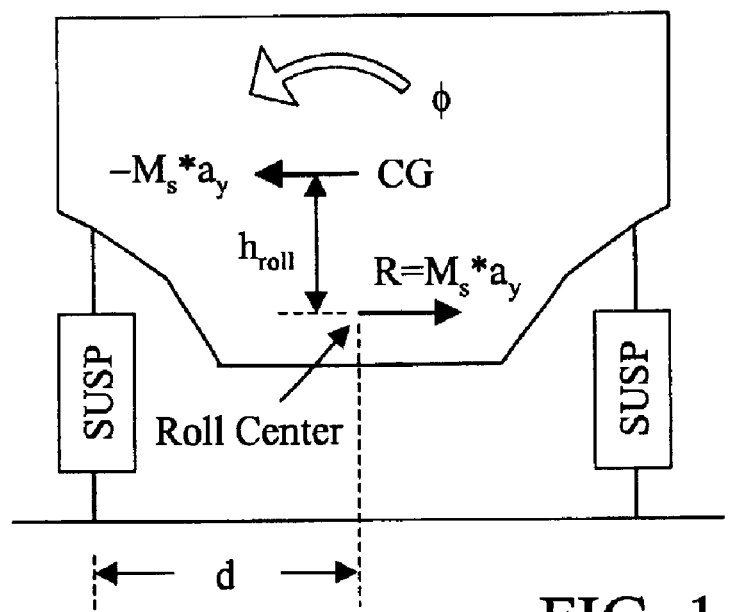
FIG. 1 depicts a simple model of vehicle roll motion during ordinary driving.

The purpose of these embodiments is to provide an estimation algorithm, for a vehicle roll angle and roll rate with respect to a road surface, that will reliably estimate roll angle in the range of roughly −30 to 30 degrees. The intended use of the estimates is in the detection of the probability of rollover and the control of active chassis systems (brakes, front or rear steering or suspension) to reduce this probability. The main challenge is to obtain at least satisfactory estimates in all operating conditions, so that the intervention of control systems takes place when it is needed and unnecessary activations are minimized. As in many other estimation problems, the key to achieving this goal is to use all information that is available but to emphasize it when it is reliable, while de-emphasizing or discarding when it is not. This is achieved by a two-stage estimation, combining a process of obtaining preliminary (rough) estimates almost directly from sensors with refinement of these estimates in an adaptive closed loop observer. The observer permits the designer to combine a priori information about the vehicle dynamics stored in equations of motion (the model) with the information obtained from sensors. By adaptively varying the observer gains the designer can change the balance between reliance on measured signals or reliance on the model, as well as the balance between the reliability of sensor data or preliminary estimates. Below, we briefly discuss various methods of estimating the roll angle and roll rate from simple physical principles, using available sensors. We also discuss pros and cons of each of the simple methods and their range of reliable operation. Subsequently, we outline the proposed approach (observer based estimation with preliminary estimates), which combines the advantages of the simpler methods and can work at least satisfactory in the entire range of vehicle operation.

The roll motion of a vehicle body is primarily caused by two types of disturbances: the excitation due to road irregularities and the inertial forces caused by cornering maneuvers. The first type of disturbance enters the vehicle body through the wheels and suspension, while the inertial load can be considered as acting directly on the body center of gravity to create a roll moment with respect to the roll axis. Since either or both of these types of excitation occur during vehicle operation, the algorithm must correctly predict the roll angles caused by each one of them. The simple estimates derived from single sensors can typically achieve satisfactory estimates for only one of these exciting mechanisms.

Estimation from Lateral Acceleration

During handling maneuvers on smooth roads, the roll motion of a vehicle body can be represented by a one-degree-of freedom model in which body roll motion is caused by the inertial force due to lateral acceleration $-M_s^* a_y$, which produces a moment $-M_s^* a_y^* h_{roll}$ about the roll axis. For significant roll angle $\phi$, a component of gravity force $M_s^* g^* \sin \phi$ also contributes to the roll moment. The symbol $M_s$ denotes "sprung" (e.g. body) mass, and $h_{roll}$ is a distance of body center of gravity to the roll axis. The equation of body roll motion is:

$$I_{xx1}*d^2\phi/dt^2 + c_{roll}*d\phi/dt + k_{roll}*\phi = -M_s*a_{ym}*h_{roll} \qquad (1)$$

Here $I_{xx1}$ is the moment of inertia of vehicle body with respect to the roll axis, $c_{roll}$ is a roll damping of suspension and $k_{roll}$ is the roll stiffness. The lateral acceleration used in equation (1) is the measured lateral acceleration, $a_{ym}$, which includes the effect of the gravity component $g^* \sin \phi$ contributing to the roll moment. The roll angle $\phi$ can be found by integrating equation (1). However, during handling maneuvers the first two terms are usually small and can be neglected. This yields the roll angle estimate as:

$$\phi_{eay} = -M_s*a_{ym}*h_{roll}/k_{roll} \qquad (2)$$

(the symbol $k_{roll}$ denotes the roll stiffness, which includes both suspension and tire compliance). An estimate of roll rate can be obtained from equation (1) or by differentiating (in practice high pass filtering) the estimate (2) of the roll angle.

It is noted that the model described by equation (1) does not take into account the excitation due to road unevenness. In reality, these road inputs cause an additional moment exerted on the body through the suspension components, which additional moment is unknown and therefore ignored. It can therefore be expected that the above method leads to acceptable estimates when the roll motion is primary caused by lateral inertial forces due to cornering, but not when it is forced by road roughness.

The estimate obtained from equation (2) has the following advantages:

(1) simplicity;

(2) provides good estimates in normal cornering maneuvers performed on smooth roads;

(3) although the estimates are affected by changes in vehicle parameters (mainly due to payload variations), their effect is bounded; and (4) tends to estimate roll angles with respect to the road, even in the presence of bank angle of the road.

The disadvantages are:

(1) poor estimates (typically severe underestimation) of roll angles and rates on rough roads, especially when driving straight; and (2) poor estimates (underestimation) at large roll angles, when wheels are off ground.

When two outside wheels are off ground, the model described by equation (1) is not valid (the restoring moment exerted by suspension components disappears, and the body rotates about a different axis). In summary, the estimates obtained from lateral acceleration are reliable during handing maneuvers performed on smooth roads when all wheels remain on the ground (roll angles below about 8 degrees).

Estimation by Integrating Measured Roll Rate

In principle, roll angle can be obtained by integrating the measured roll rate, but in practice two difficulties arise. First, pure integration is known to be extremely sensitive to sensor bias, since the bias is integrated over time. Therefore, the integration process is replaced by pseudo-integration (possibly with resetting); the roll rate is passed through a low pass filter, for example having a transfer function of $1/(s+0.5)$ instead of a pure integrator $1/s$. The pseudo-integrator reduces the effect of sensor bias but also has a tendency to "wash away" (reduce with time) the constant or slowly-varying component in the actual roll angle signal. This leads to underestimation of roll angle in steady-state turns.

The second problem follows from the fact that the roll rate sensor is an inertial sensor and measures the absolute rate of rotation of vehicle body, not the angle with respect to the road. Thus the measured roll rate includes the component of roll rate resulting from the changing bank angle of the road. Since these changes can be assumed to be slow compared to the changes in roll angle resulting from road roughness, the effect of road bank angle can be estimated and at least partially compensated. The estimate of the bank angle effect can be obtained by taking the difference between the roll rate measured and that estimated from lateral acceleration (as described above), then passing it through a low-pass filter (to retain only slowly-varying component, presumably corresponding to the bias and/or change in bank angle of the road). This produces the estimate of bias or bank angle effect, which is then subtracted from measured roll rate, producing the centered value.

This method of estimating roll angle has the following advantages:

(1) produces good estimates when roll angle changes quickly, specifically in quick transient maneuvers under persistent road excitations;

(2) works well for small and large roll angles; and (3) estimates are not sensitive to vehicle parameter variations, since no parameter values are used in the estimation process.

Among disadvantages of the method are:

(1) sensitivity to sensor bias;

(2) sensitivity to changing bank angle of the road; and (3) poor estimates (usually underestimation) of slowly varying roll angles (e.g. in steady-state turns).

Note that, due to necessity of introducing the bias/bank effect cancellation, the simple estimate described here uses not only roll rate, but also a lateral acceleration signal (which, however, is of secondary importance).

Estimate from Suspension Relative Position Sensors

Many controlled suspensions are equipped with suspension relative position sensors, which measure suspension deflections (relative positions of the wheel with respect to the body) at each corner. During cornering on a smooth road, suspension is compressed on the outside and extended on the inside of vehicle. The roll angle can be estimated from the following expression, based on the geometry of the roll motion:

$$\phi = (\Delta S_{LF} - \Delta Z_{RF} + \Delta Z_{LR} - \Delta z_{RR})/(2*t_w) \quad (3)$$

where $\Delta z$ denotes measured suspension deflection at each corner (LF, RF, LR and RR) at the wheel location and $t_w$ is track width. Even on a perfectly smooth road, the estimate from equation (3) determines the roll angle of the body with respect to the plane defined by the centers of wheels and does not take the "axle roll" into account, which is due to tire deflection. Thus the estimate needs to be corrected, either by introducing a multiplier (larger than 1) or by estimating the "axle roll" from lateral acceleration. In the latter case, the estimated roll angle is:

$$\phi_{erp} = (\Delta Z_{LF} - \Delta Z_{RF} + \Delta Z_{LR} - \Delta Z_{RR})/(2*t_w) - M*a_{ym}*h/k_{tireroll} \quad (4)$$

where M is vehicle mass, h the height of center of gravity, and $k_{tireroll}$ is roll stiffness resulting from tire stiffness. In practice, the term $M*h/k_{tireroll}$ can be treated as a constant. The estimate of roll rate can then be obtained by differentiating the roll angle.

Since the sensors measure only the relative motions of the body with respect to the wheels and the wheel vertical motions are unknown, this method of estimation creates problems when wheel motions are significant. This occurs for example when vehicle roll motion is caused by vertical road inputs during straight driving. For example, a vehicle in a right-hand turn on a smooth road will experience an inertial force acting to the left, which creates a moment that forces counterclockwise body roll, bringing about compression of the left suspension and extension of the right one. But very similar suspension deflections may be caused by an upward road input (bump) on the left side and downward road input (a ditch) on the right side during straight driving. These road inputs will cause the vehicle body to roll clockwise, and the estimate obtained from equation (4) will be incorrect.

As a consequence of limitations and assumptions involved in this method, it has the following pros and cons.

The advantages are:

(1) simplicity; and (2) good estimates in transient and steady-state cornering maneuvers performed on smooth roads The disadvantages are:

(1) poor estimation on rough roads; and (2) poor estimation (underestimation) for large roll angles (during two wheel lift off condition).

It should be noted that another approach in estimating the body roll angle and roll rate from suspension sensors is possible, at least in principle. The suspension forces can be estimated from the measured relative positions and velocities and known spring and damper characteristics. Given the estimates of suspension forces, the roll rate and roll angle of the body can be estimated by integrating the dynamic equation describing the roll motion. This approach by itself is impractical, due to difficulties in integrating the roll acceleration (once to get the roll rate and twice to obtain the roll angle). However, it can be utilized in the observer-based techniques described below.

From the three methods of estimation described above, the following conclusions can be drawn. First, none of the simple methods is capable of producing satisfactory results in all operating conditions. Furthermore, estimates obtained from lateral acceleration and roll rate are complementary in most situations in the sense that one of them usually produces a good estimate when the other can be expected to perform poorly. But, unfortunately, it is not easy to tell which one is correct without additional information. Both estimates can be combined using observer techniques. On the other hand, simple estimates obtained from lateral acceleration and relative position sensors produce good estimates in similar conditions. Merely combining them would not provide dramatic improvements. Since lateral acceleration, however, includes information about the disturbances acting directly on the body (inertial forces due to cornering), while the suspension sensors inform about the road disturbances entering through the suspension, both pieces of information can be combined using observer techniques.

Model-Based Estimation (Observer)

Another commonly used method of estimation is an observer-based approach. An observer is essentially a model of the estimated system (a vehicle in this case) run on the on-board microprocessor, which is driven by the same inputs (either measured or estimated) to which the vehicle is subjected. A simple example of an (open loop) observer is the model given by equation (1), which is driven by the lateral acceleration input. Due to system-model mismatch (un-modeled dynamics, parameter variations, etc.) and the presence of unknown, immeasurable disturbances, the estimates obtained from the open loop observer would deviate from the actual values as time goes by. In order to reduce the estimation error, at least some of the measured outputs are compared to the same variables estimated by the observer; and the difference, after being multiplied by a gain matrix, is fed back into the observer. This leads to a closed loop observer. A closed loop observer has several features that make it attractive for estimation purposes. First, it uses all the available information, including our understanding of system dynamics captured in the model and the measured signals (including the inputs and outputs). Secondly the balance between the importance attached to the model and that of the measured signals can be controlled by the designer through the selection of the observer gain matrix. (Small gains indicate reliance on the model and high gains on measurements). Individual gains can also be adaptively adjusted depending on the confidence level in various signals in particular operating conditions.

In the case of an observer for the vehicle body roll motion, there are two fundamental difficulties. First, vehicle roll is primary caused by body inertial forces and the inputs from an uneven road. Each one of these inputs acting alone can be sufficient to cause vehicle rollover, and they are only weakly coupled. Thus the sensor set should be sufficient to detect (directly or indirectly) motions resulting from each one of these causes. This condition is satisfied when the sensor set consists of lateral acceleration and roll rate sensors. The first sensor provides information about the roll motion caused by cornering maneuvers, especially in response to slowly varying inputs, and the second indicates the effects of road inputs and quickly changing lateral acceleration on roll motion (even beyond two wheel lift off).

The second sensor set can also be quite effective, at least for relatively small roll angles. The suspension sensors provide information about the disturbances resulting from road inputs (since suspension forces can be estimated). Thus the combination of lateral acceleration and suspension sensors permits one to estimate both types of excitation and use these estimates to drive the observer equations and hence to estimate the roll motion. It becomes more difficult, however, to track the roll motion for large roll angles beyond two wheel lift off, since the suspension sensors no longer provide accurate information.

The second fundamental difficulty stems from the fact that the dynamics of the roll motion are different during normal operation (all wheels on the ground) and in rollover phase (in two wheel lift off condition). During normal driving the body rotates about the roll axis, and the overturning moment is balanced by the restoring moment developed primarily by suspension (springs, roll bars and dampers). During the rollover phase, the entire vehicle rotates about the axis defined by the contact patches of outside tires. The restoring torque of suspension vanishes and is replaced by the torque due to gravity force. Thus the vehicle roll motion is described by different models in each phase of motion, with the transition point depending on the roll angle, which is estimated (that is unknown). Using the estimate calculated by the observer to determine the transition point can lead to instability. Thus other means, in this case preliminary estimates and direct measurements, are used to determine the transition. For this purpose a roll angle index is used, which is determined from measured lateral acceleration and preliminary estimates of roll angle. It can be interpreted as a composite measure of roll angle and is used in particular to determine when the vehicle may be transitioning from normal operation to two-wheel-lift-off condition.

For the reasons described above, the observers used for each of the sensor sets are adaptive closed-loop observers, in which both the parameters of the observer equations and the observer gains depend on the conditions of motion (primarily determined from measurements and the preliminary estimates). In that way the observer equations cover the entire range of motion of interest. The variables fed back into the observer are not only the directly measured variables, but also specially constructed "pseudo-measurements", which are in essence the preliminary estimates of roll angle. In what follows, we illustrate this approach for each sensor set.

Figure 2:
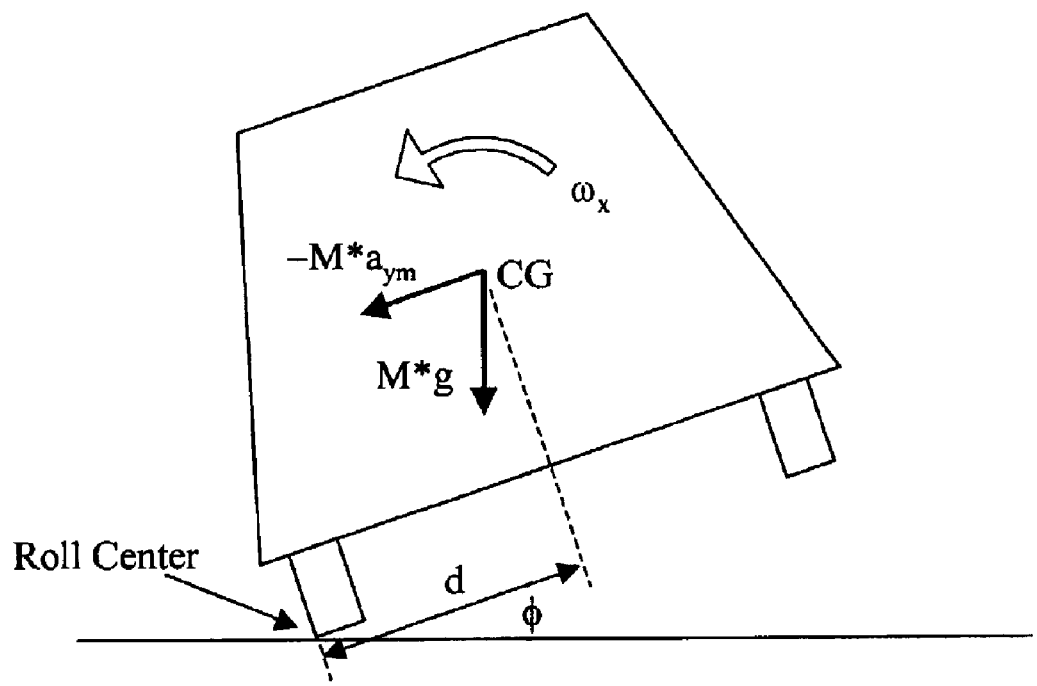
FIG. 2 depicts a simple model of vehicle roll motion during rollover phase.

In the case of lateral acceleration and roll rate sensors, the models describing vehicle roll motion in both phases are illustrated in FIGS. 1 and 2. During normal operation, shown in FIG. 1, the vehicle body rolls about the roll axis (typically located on the longitudinal axis of symmetry just above the ground). Ignoring the disturbance from the road (which is unknown), the body roll (caused by cornering forces) can be described by the following equation:

$$I_{xx1}*d^2\phi/dt^2 + c_{roll}*d\phi/dt + k_{roll}*\phi = -M_s*a_{ym}*h_{roll} \tag{5}$$

which is essentially equivalent to equation (1). Here $I_{xx1}$ is the body moment of inertia about the roll axis, $c_{roll}$ is roll damping of suspension, $k_{roll}$ is the roll stiffness, $a_{ym}$ is measured lateral acceleration, $M_s$ is sprung mass and $h_{roll}$ is the height of the vehicle body center of gravity above the roll axis. During the rollover phase (FIG. 2), the whole vehicle rotates about a different axis; and the only stabilizing moment is due to the component of gravity force, since the restoring moment exerted by suspension vanishes when inside wheels are out of contact with the ground. Thus the equation of roll motion is:

$$I_{xx2}*d^2\phi/dt^2 = -M*a_{ym}*h - M*g*d*\cos\phi \tag{6}$$

In the above equation $I_{xx2}$ denotes the moment of inertia of the entire vehicle about the axis of rotation (which is an axis passing through the centers of outside tire contact patches), M is the total mass of vehicle, h is the height of the center of gravity above ground, g is gravity acceleration, and d is half-track width. Transition between the two models occurs gradually. Note that the second model is marginally stable (pure integrator). Such a system is extremely sensitive to parameter variations and disturbances.

Both phases of motion can be described by the following equation:

$$d^2\phi/dt^2 + (c/I)*d\phi/dt + (k/I)*\phi = -(M*h/I)*a_{ym} - (M*g*d/I)*\cos\phi \quad (7)$$

where the values of parameters (c/I, k/I, M*h/I and M*g*d/i) depend on a roll angle index, which depends primarily on the preliminary estimate of the roll angle. These parameters are selected in such a way that at small values of roll angle the parameters correspond to those of equation (5) and for large values the parameters correspond to those of equation (6), with very small values of damping (c) and stiffness (k) parameters maintained in order to retain asymptotic stability of the model.

The model described by equation 7 is an open loop observer with parameter adaptation. In order to improve robustness, a closed loop observer is used with feedback of measured signals. The roll rate ($\omega = d\phi/dt$) is measured almost directly (only bias and bank effects are removed). A preliminary estimate of roll angle is obtained by blending the estimates obtained from lateral acceleration (equations (1) and (2)) and by integrating roll rate. This preliminary estimate is used as a "pseudo-measurement". The equation of the closed loop observer becomes:

$$d^2\phi_e/dt^2 + (c/I)*d\phi_e/dt + (k/I)*\phi_e = -(M*h/I)*a_{ym} - \quad (8)$$
$$(M*g*d/I)*\cos\phi_e -$$
$$g_p*(\phi_e - \phi_m) -$$
$$g_d*(d\phi_e/dt - \omega_{mc})$$

Figure 3:
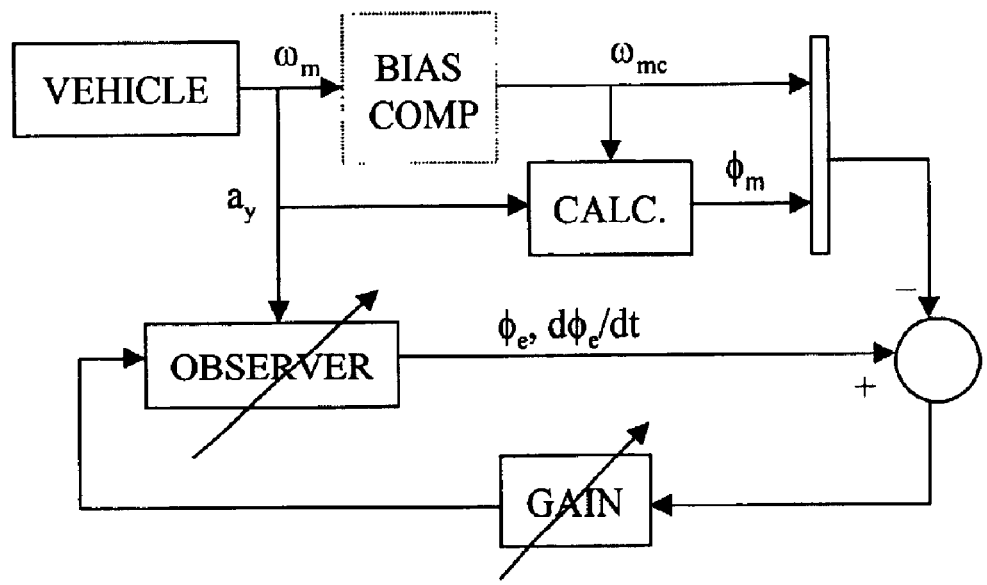
FIG. 3 depicts the general structure of an observer of roll motion using measured lateral acceleration and roll rate signals.

Here $\phi_e$ is the final estimate of roll angle $\phi$, $\phi_m$ is the "pseudo-measured" roll angle (e.g. the preliminary estimate), and $\omega_{mc}$ is the measured and centered roll rate. The parameters $g_p$ and $g_d$ are the proportional and derivative gains of the observer. Since the roll rate, $\omega_{mc}$, is derived from a directly measured quantity, it is quite reliable throughout the operating range of vehicle and the gain $g_d$ associated with it is uniformly high. On the other hand, the preliminary estimate of roll angle, obtained primarily from lateral acceleration, is good during handling maneuvers, when the magnitude of lateral acceleration is high. Thus the proportional gain, $g_p$, is a function of slew-limited magnitude of lateral acceleration and increases with the magnitude of lateral acceleration. In addition, the gain decreases as the roll angle index increases, since at large roll angles the estimate obtained from lateral acceleration is not accurate. The general scheme of the adaptive closed loop observer is depicted in FIG. 3. It was found that inclusion of the non-linear term $(M*g*d/I)*\cos\phi_e$ in the closed loop observer (8) is not critical to observer performance. This is because during near rollover events, part of the restoring moment due to gravity force can be compensated by (non-zero) suspension stiffness, and because in rollover situations the observer response is dominated by the last term (since the roll velocity is large).

The approach described above is modified when suspension sensors are used instead of roll rate sensor. In this case the main force inputs affecting the vehicle body roll can be estimated from the sensor outputs. The suspension force at each corner can be determined by adding the spring, damper and roll bar forces. For example, the total force in the left front suspension is:

$$F_{stLF} = F_{dLF}[d(\Delta Z_{LF})/dt] + F_{sLF}(\Delta Z_{LF}) + F_{rbF}(\Delta Z_{LF} - \Delta Z_{RF}) \quad (9)$$

where damping ($F_{dLF}$) and spring ($F_{sLF}$) forces are (in general nonlinear) functions of measured relative velocity ($d(\Delta Z_{LF})/dt$) and relative positions ($\Delta Z_{LF}$) of suspension and can be determined from look-up tables. The roll bar force is a function of the difference between the left and right suspension deflections ($\Delta Z_{LF} - \Delta Z_{RF}$).

During normal operation, the equation of roll motion of the vehicle body is:

$$I_{xx1}*d^2\phi/dt^2 = -M_s*a_{ym}*h_{roll} + (-F_{stLF} + F_{stRF} - F_{stLR} + F_{stRR})*d \quad (10)$$

During the rollover phase, the vehicle rotates about a different axis and the stabilizing moment is provided by the gravity force instead of suspension forces. Thus the roll equation is given by equation (6). Equations (10) and (6) can be combined into:

$$d^2\phi/dt^2 = \Sigma M_x/I_{xx} \quad (11)$$

where the moment of inertia $I_{xx}$ is a function of the roll angle index and is equal to $I_{xx1}$ for small angle and $I_{xx2}$ for large roll angles. The sum of roll moments is given by:

$$\Sigma M_x = -M_s * a_{ym} * h_{roll} + \quad (12)$$
$$\eta * (-F_{stLF} + F_{stRF} - F_{stLR} + F_{stRR}) * d -$$
$$\varepsilon * (M * g * d) * \cos\phi$$

where the multipliers $\eta$ and $\epsilon$ depend on the roll angle index. Specifically, $\eta$ is equal to 1 for small roll angles and becomes small for large roll angles, while $\epsilon$ is equal to 0 for small roll angles and becomes close to 1 for large roll angles.

Using the preliminary estimates of roll angle and roll rates, $\phi_{erp}$ and $\omega_{erp}$, as "pseudo-measurements", the equation of the closed loop observer can be written as:

$$d^2\phi_e/dt^2 + g_d*(d\phi_e/dt - \omega_{erp}) + g_p*(100_e - \phi_{erp}) = \Sigma M_x/I_{xx} \quad (13)$$

Figure 4:
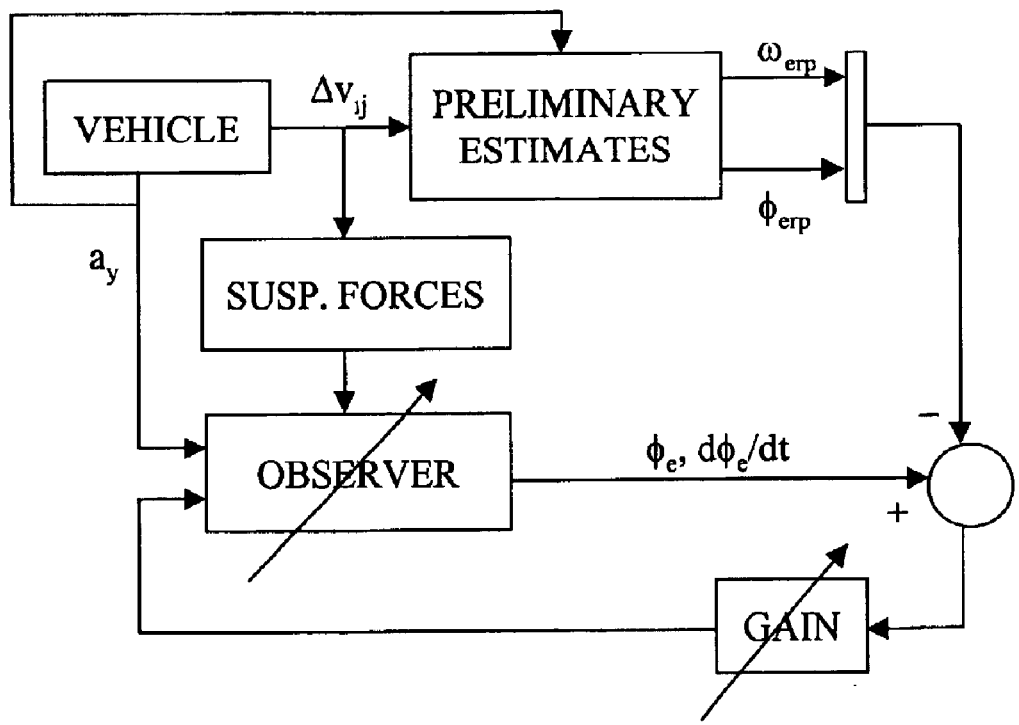
FIG. 4 depicts the general structure of an observer of roll motion using measured lateral acceleration and suspension deflection signals.

The proportional and derivative gains depend on the slew-filtered magnitude of lateral acceleration and on the roll angle index. They increase as the acceleration increases and decrease as the roll angle index increases, but never drop to zero in order to maintain stability of the observer. The general structure of the observer is depicted in FIG. 4. Again, neglecting the nonlinear term in equation (12) representing the restoring moment due to gravity force does not significantly affect the observer performance.

Detailed Description of Algorithms

The embodiments described herein provide algorithms for estimating roll angle and roll rate of vehicle body with respect to the road using either of two sets of sensors: (1) lateral acceleration and roll rate sensors or (2) lateral acceleration and suspension relative position sensors. In both cases the process of calculating the estimates can be divided into two stages: first or preliminary estimates of roll angle (and roll rate) are obtained primarily from the sensor outputs, then these first estimates are used as inputs to a dynamic, closed-loop observer. The observer is a simplified model of vehicle roll mode that uses the measurements and the first estimates ("pseudo-measurements") as feedback signals. The observer produces second or final estimates of roll angle and roll rate. Since the dynamics of roll motion are different in normal operation and during rollover phase, the parameters of the model vary depending on conditions of motion, primarily determined from the preliminary estimates of roll angle. The observer gains (which are the parameters by which the feedback signals are multiplied) are also varied as functions of preliminary estimates and measured signals (lateral acceleration) in order to reflect the level of confidence in these signals as it varies with conditions of motion.

In the case of the first sensor set, two preliminary estimates of roll angle are first obtained: one using measured lateral acceleration and the other by pseudo-integrating measured roll rate. Prior to integration, the effects of bias and slowly changing bank angle of the road are removed from the measured roll rate by low-pass filtering the difference between the roll rates measured and estimated from lateral acceleration. The preliminary estimates are combined to yield an improved, first estimate, which is subsequently used as a "pseudo-measurement" by the observer. Using two preliminary estimates, the measured roll rate and lateral acceleration a roll angle index are computed. The latter indicates when roll angle is large (i.e. close to or exceeding the angle corresponding to two wheel lift off) and is used to determine transition between normal operation and near rollover phase. This index can be thought of as a first estimate of the magnitude of roll angle, but it is a more composite variable in order to make it more robust. The proportional gain of the observer is then computed as a function of magnitude of lateral acceleration and the roll angle index. (This gain is a multiplier by which the improved preliminary estimate of roll angle is multiplied before it is fed into the observer). Subsequently, the parameters of the roll model used by the observer are determined as functions of roll angle index. Finally, the observer equations are integrated to determine the final estimates of roll angle and roll rate.

In the case of the second sensor set comprising suspension relative position (or velocity) sensors and lateral acceleration, the algorithm proceeds as follows. The first or preliminary estimate of body roll angle is obtained by combining the roll angle derived from suspension deflections with the axle roll (due to tire deflections) derived from measured lateral acceleration. This preliminary estimate is then used as a "pseudo-measurement" of roll angle by the observer. Based on the preliminary estimate of the roll angle and the measured lateral acceleration, a roll angle index is determined. Suspension forces are calculated using suspension stiffness and damping characteristics and measured relative positions and relative velocities derived from relative positions. Subsequently, the parameters of the observer are computed as functions of roll angle index and the estimated roll acceleration is determined. The observer gains are then determined from the roll angle index and the magnitude of lateral acceleration. The second or final estimates of roll angle and roll rate are determined by integrating the observer equations.

Figure 5:
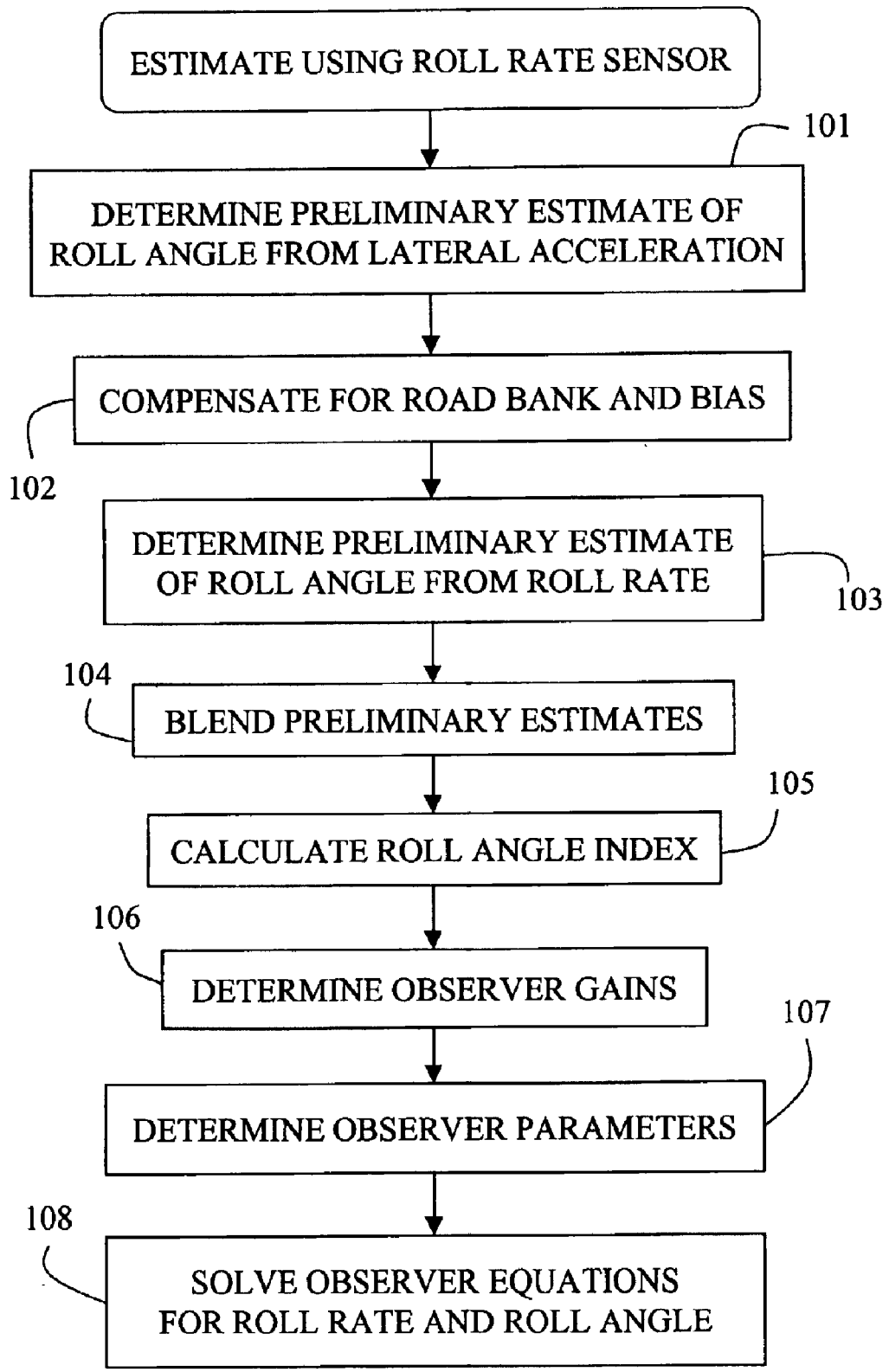
FIG. 5 depicts a flow chart of a process for estimating roll rate and roll angle using the observer of FIG. 3.

In this section the algorithms for estimation of roll angle and roll rate using both sensor sets are described in detail. The flow chart for the algorithm using roll rate and lateral acceleration sensors is shown in FIG. 5. Routine ESTIMATE USING ROLL RATE SENSOR begins at step 101, in which a preliminary estimate of roll angle $\phi_{eay}$ is determined from lateral acceleration. It is preferably calculated from equation 2:

$$\phi_{eay} = -M_s * a_{ym} * h_{roll}/k_{roll}$$

in which the constant coefficient $M_s * h_{roll}/k_{roll}$ relating the roll angle to lateral acceleration (sometimes referred to as "roll gain") can be replaced by a look-up table if the suspension roll stiffness has a non-linear characteristic. A dynamic equation (1) could also be used instead of the steady-state value, but it does not seem to provide a significant advantage. The preliminary roll angle from lateral acceleration is then differentiated to yield a first estimate $\omega_{eay}$ of roll rate from lateral acceleration. In practice, this differentiation is accomplished by a high-pass filter, for example with a transfer function of $a*s/(s+a)$ where $a=40$ rad/s.

Figure 7:
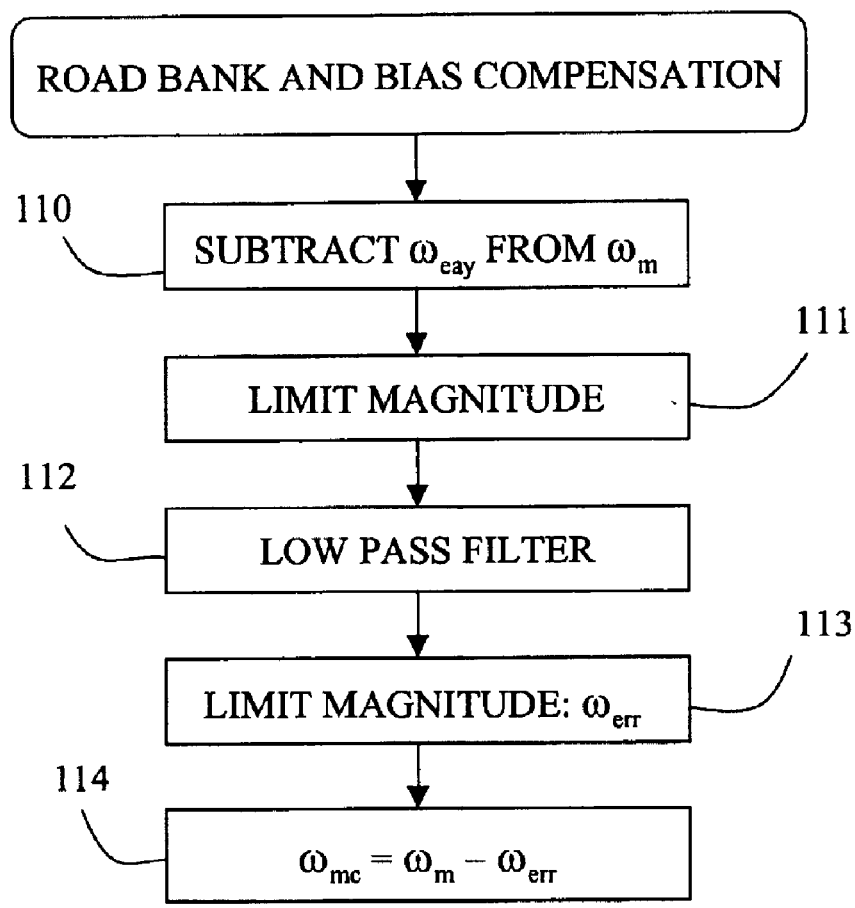
FIG. 7 depicts a flow chart of a process for removing the effects of road bank and slowly varying bias in measured roll rate.

At step 102 the effects of sensor bias and (slowly varying) bank angle of the road on the measured roll rate are estimated and compensated to yield a measured and centered roll rate $\omega_{mc}$. This process proceeds as shown in FIG. 7. At step 110 the roll rate obtained from lateral acceleration $\omega_{eay}$ is subtracted from the measured roll rate $\omega_m$. It is then passed through a saturation block at step 111 in order to limit the magnitude of the difference to a reasonable value (e.g. 0.1 rad/s). At step 112, it is passed through a low-pass filter, for example with a transfer function of $a/(s+a)$ with $a=1$ rad/s. At step 113, it is once again passed through a saturation block to limit the magnitude to 0.1 rad/s. The result is the estimated effect of bias and slowly-varying bank angle of the road on measured roll rate, $\omega_{err}$. At step 114, this estimated "error" is then subtracted from the measured roll rate $\omega_m$ to yield the measured and centered roll rate $\omega_{mc}$. As a result of this process, the slowly varying component of the measured roll rate, which is not consistent with the estimate of roll rate obtained from lateral acceleration, is rejected, since it is attributed to the effect of sensor bias and slowly varying bank angle of the road. But quickly varying components, such as those caused by road roughness, are maintained, even though they do not match the estimate obtained from lateral acceleration.

Returning to FIG. 5, at step 103 a preliminary estimate of roll angle from roll rate $\phi_{e\omega}$ is computed by integrating the measured and centered roll rate $\omega_{mc}$. In actual implementation, a low-pass filter, such as the one with a transfer function of $1/(s+0.5)$, is used instead of an integrator.

Figure 8:
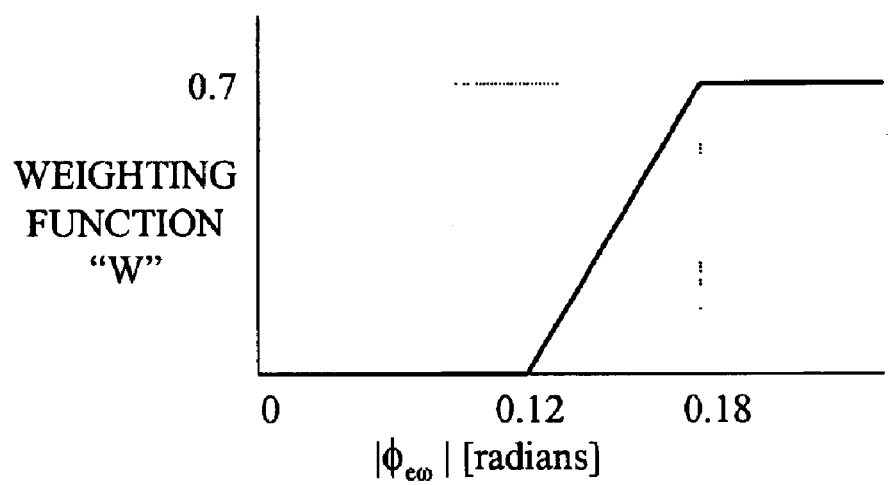
FIG. 8 depicts a weighting function for use in the blending of preliminary estimates of roll angle in the process depicted in the flow chart of FIG. 5.

At step 104, the first estimate of roll angle, $\phi_m$, is obtained by combining the preliminary estimate $\phi_{eay}$ obtained from lateral acceleration and the preliminary estimate $\phi_{e\omega}$ obtained by integrating roll rate. This is done according to the following equation:

$$\phi_m = (1-w) * \phi_{eay} + w * \phi_{e\omega} \qquad (14)$$

where w is a weighting coefficient depending on the magnitude of the preliminary estimate of roll angle from roll rate, $\phi_{e\omega}$. For small $|\phi_{e\omega}|$ the weighting coefficient is zero (0); and, for the roll angles approaching or exceeding the value corresponding to two wheel lift off, it increases to about 0.7. The weighting coefficient w as a function of the magnitude of $|\phi_{e\omega}|$ is illustrated in FIG. 8. The reason for this weighting of two estimates is that for small values of roll angles the estimate from lateral acceleration is more reliable, while for large roll angles the estimate obtained through integration of measured and centered roll rate is more likely to be valid and should be emphasized. The first estimate $\phi_m$ of roll angle is subsequently used as a "pseudo-measurement" in the observer.

At step 105 a roll angle index is determined. The roll angle index is a composite measure indicating the magnitude of the roll angle relative to the roll angle at which two-wheel-lift-off is initiated. A roll angle index significantly below 1 indicates a roll angle in the normal range; a roll angle index of 1 means that the roll angle is at the threshold of two-wheel-lift-off; and a roll angle index greater than one indicates rollover phase, with two wheels off the ground. If the maximum roll angle in normal operation is $\phi_{max}$, the maximum roll rate is $\phi_{max}$ and the maximum lateral acceleration of the vehicle on dry surface is $a_{ymax}$, then the roll angle index is calculated as follows $$\text{Index} = \max\{|[\phi_{e\omega}/\phi_{max} + (\omega_{mc} + k_d * d\omega_{mc}/dt)/\omega_{max} - a_y/a_{ymax}]| * c_1; \ [|\phi_{eay}|/\phi_{max}]\} \qquad (15)$$

The roll angle index is large when either the preliminary roll angle $\phi_{eay}$ estimated from lateral acceleration is large in magnitude or a composite term, which is a linear combination of roll angle estimated from roll rate, measured and centered roll rate and measured lateral acceleration, is large. The parameter $c_1$ is a weighting constant, which is less than 1. A roll angle index equal to 1 indicates that the roll angle (according to preliminary estimates) is close to critical roll angle, corresponding to the initiation of two-wheel-lift-off. This information is used in the observer to change the observer parameters and to adjust observer gains. The index is then passed through a slew filter, which limits its rate of change to 3 1/s in each direction.

At step 106 the proportional gain of the observer $g_p$ is calculated as a function of the magnitude of lateral acceleration and the roll angle index calculated at step 105. The initial value of the index, $g_{po}$, is multiplied by two factors. The first factor is a function of the magnitude of lateral acceleration $|a_{ym}|$. First, $|a_{ym}|$ is passed through a slew filter, which limits the falling rate to about 4 m/s³, yielding $|a_{ymf}|$. The first factor $f_{mult1}$ is then computed as:

$$f_{mult1} = \max(1, ((|a_{ymf}| - 0.5) * 0.5) \quad (16)$$

Figure 9:
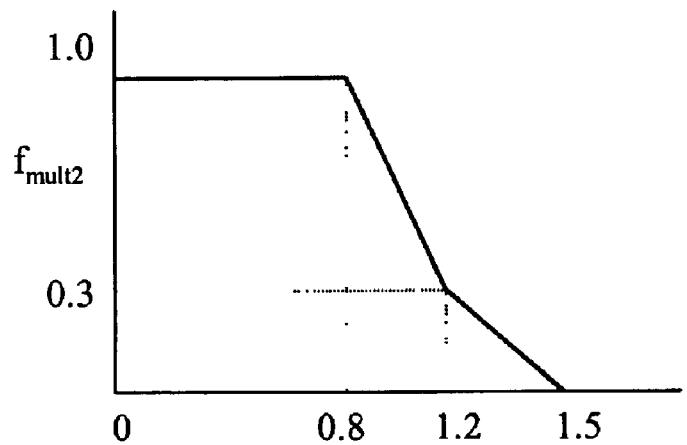
FIGS. 9–13 depict observer parameters as a function of roll angle index for the process depicted in the flow chart of FIG. 5.
Figure 10:
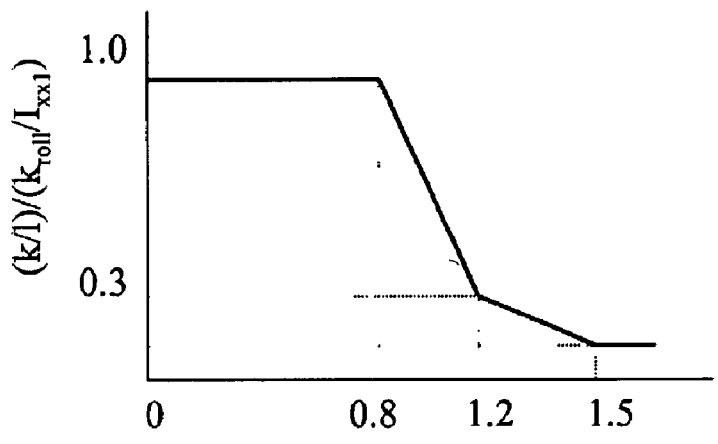
Figure 11:
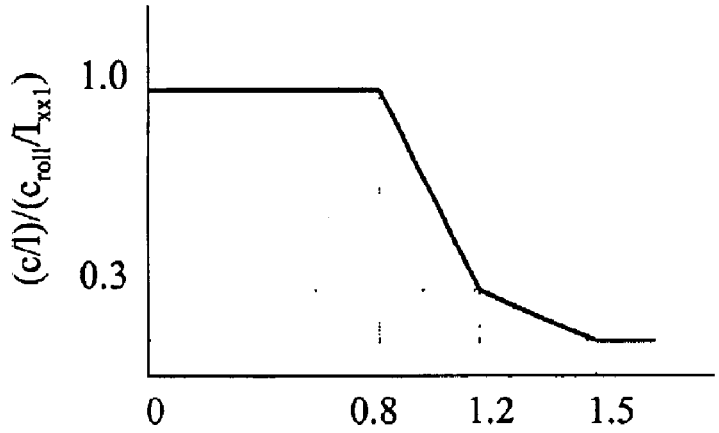
Figure 12:
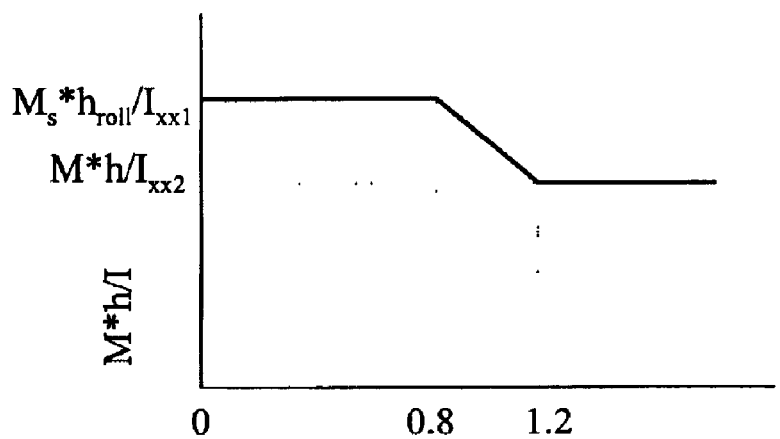
Figure 13:
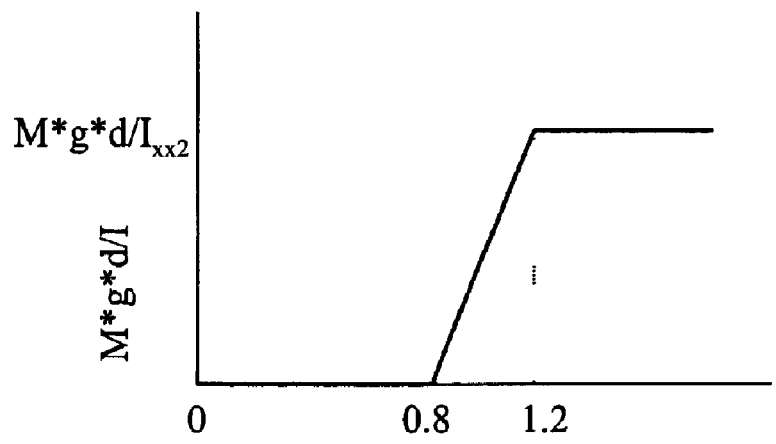

The first factor can be implemented as a one-dimensional look-up table with magnitude of $a_{ymf}$ as input. The second factor $f_{mult2}$ is determined from a look-up table as a function of roll angle index. A typical relationship between the index and the multiplier is shown in FIG. 9. This second factor is equal to one (1.0) when the index is significantly below one and drops gradually to zero as the index increases beyond one. The gain $g_p$ is then calculated as:

$$g_p = g_{po} * f_{mult1} * f_{mult2} \quad (17)$$

Thus the gain increases with the magnitude of lateral acceleration but decreases as the primary estimate of roll angle, as determined by the roll angle index, approaches or exceeds the critical value. This is motivated by the observation that the first estimate of roll angle $\phi_m$, obtained primarily from lateral acceleration and fed into the observer through the gain $g_p$, is the most reliable in severe handling maneuvers, when the lateral acceleration is large. It loses validity when the roll angle reaches or exceeds values corresponding to two-wheel-lift-off. The differential gain, $g_d$, is constant. Typical values of the observer gains are $g_{po}=20$ and $g_d=70$ when calculations are performed in SI units (roll angle and roll rate in radians and radians/s, respectively).

At step 107 the values of parameters occurring in the observer equation 8 are determined as a function of roll angle index using look-up tables. The values of interest are the four parameters denoted in the equation as (c/I), (k/I), (M*h/I) and (M*g*d/I). They are determined in such a way that, for roll angle index significantly below one, they correspond to the parameters of equation (5) (describing roll dynamics for small roll angles) and for the large roll angle index they correspond to the parameters of equation (6), which describes roll dynamics for large roll angles. But non-zero values of roll damping (c/I) and roll stiffness (k/I) are maintained to assure stability of the observer. Examples of relationships between the roll angle index and the observer parameters are given in FIGS. 10–13. As indicated previously, the value of parameter (M*g*d/I) can be set to zero without significant loss of performance, because the restoring moment due to gravity force is partially compensated by the suspension stiffness and the observer equation is dominated by the roll velocity term in the rollover phase.

At step 108 the closed loop observer equation with parameters and gains determined in the previous two blocks is integrated and final estimate of roll angle $\phi_e$ and roll rate $\omega_e = d\phi_e/dt$ are obtained. The final estimate of roll rate $\omega_e$ is close to the measured and centered value $\omega_{mc}$, which can be used as the final estimate of roll rate instead of $\omega_e$.

Figure 6:
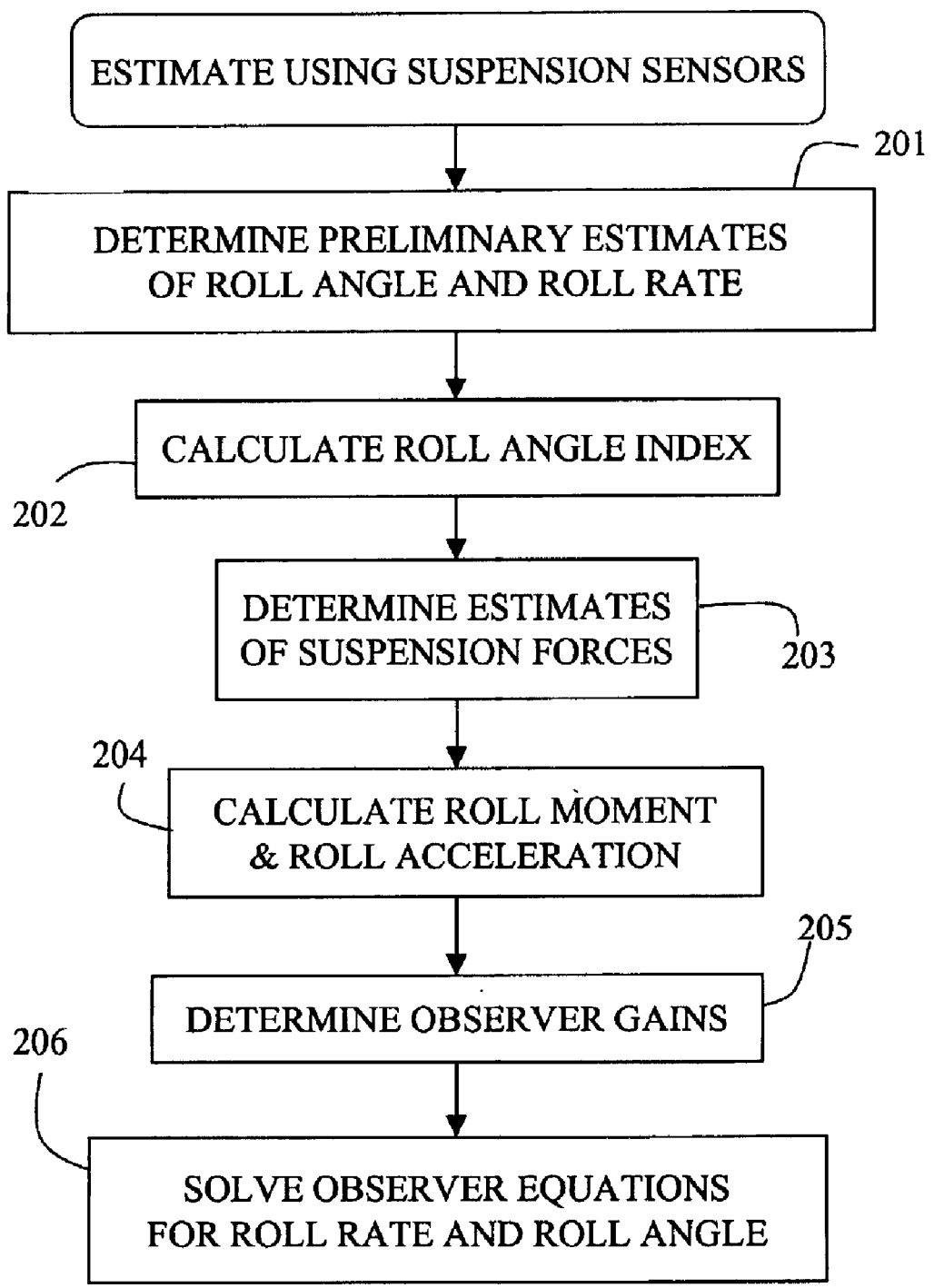
FIG. 6 depicts a flow chart of a process for estimating roll rate and roll angle using the observer of FIG. 4.

The flow chart of the estimation algorithm using lateral acceleration and suspension relative position sensors is given in FIG. 6. Routine ESTIMATE USING SUSPENSION SENSORS begins at step 201, in which the preliminary estimates of roll angle and roll rate are obtained by combining the estimates of body roll angle and roll rate obtained from relative positions and velocities with the axle roll determined from lateral acceleration. Specifically, the roll angle from relative displacement (position) is determined from equation (4):

$$\phi_{erp} = (\Delta Z_{LF} - \Delta Z_{RF} + \Delta Z_{LR} - \Delta Z_{RR})/(2*t_w) - M*a_y*h/k_{tireroll}.$$

The roll rate estimate is obtained by differentiating the above equation, which leads to:

$$\omega_{erp} = (\Delta v_{LF} - \Delta v_{RF} + \Delta v_{LR} - \Delta v_{RR})/(2*t_w) - d(M*a_y*h/k_{tireroll})/dt \quad (18)$$

where the relative velocities of suspension, $\Delta v_{LF}$, etc., are usually directly available from the suspension control algorithm and the time derivative in the last term is replaced by a high pass filter, for example with a transfer function of 40s/(s+40).

At the next step 202, the roll angle index is calculated as a function of the measured lateral acceleration $a_{ym}$ and the preliminary estimate of roll angle $\phi_{erp}$ from relative displacement. The index is computed as follows:

$$\text{Index} = \max(|a_{ym}|/a_{ymax}, |\phi_{erp}|/\phi_{max}) \quad (19)$$

where $a_{ymax}$ and $\phi_{max}$ are the same as defined earlier.

At step 203 the estimates of suspension forces are calculated using known suspension characteristics and the measured relative position and velocity at each corner. Each of the four suspension forces is estimated from equation (9).

Figure 14:
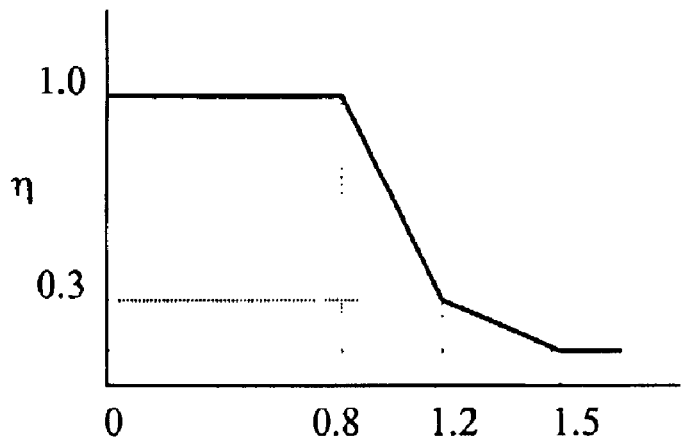
FIGS. 14–16 depict observer parameters as a function of roll angle index for the process depicted in the flow chart of FIG. 6.
Figure 15:
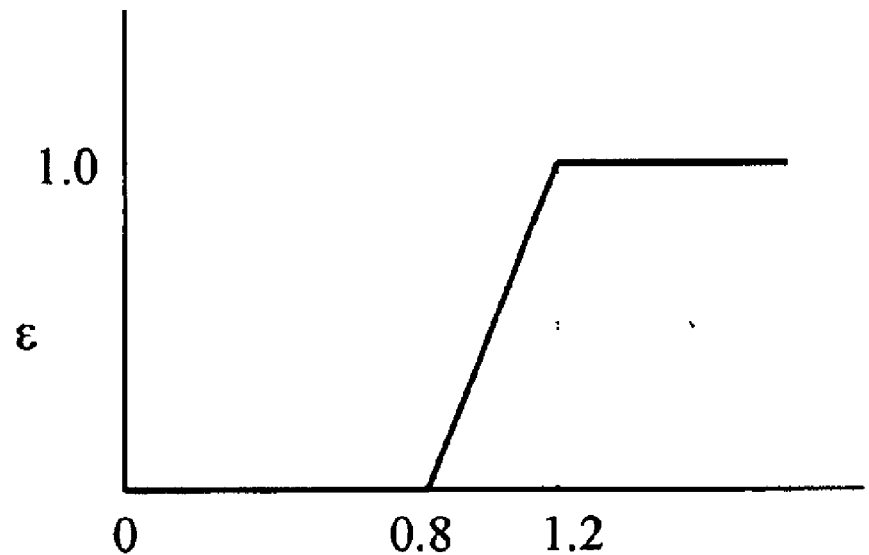
Figure 16:
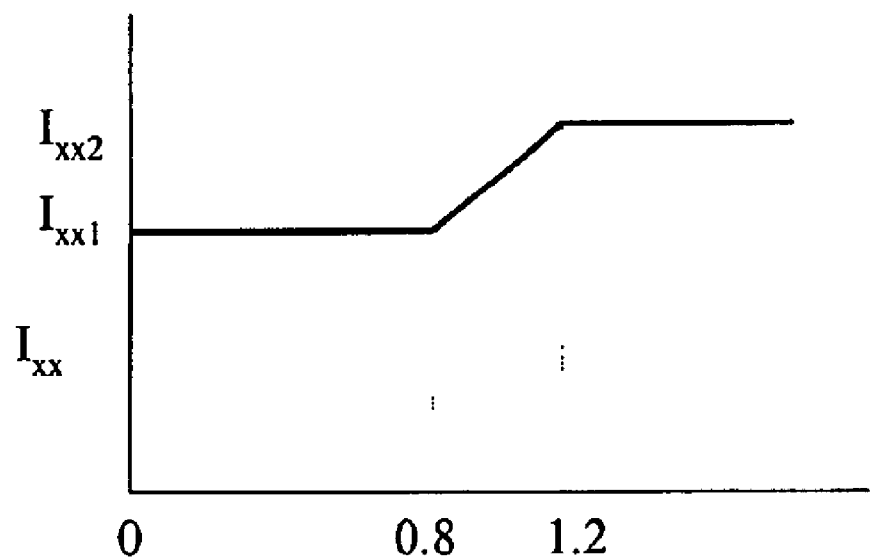

At step 204 the roll moment acting on the vehicle and the roll acceleration are computed using equations (11) and (12). First the multipliers $\eta$ and $\epsilon$ are determined as functions of roll angle index using look up tables. For small roll angle index (below 1), the multiplier $\eta$ is equal to 1 and becomes small for large roll angle index; the multiplier $\epsilon$, on the other hand, is equal to zero for low values of roll angle index and becomes close to one for large values of roll angle index. The moment of inertia of the vehicle, $I_{xx}$ also changes with the roll angle index, assuming a value of $I_{xx1}$ for the roll angle index below 1 and reaching the value of $I_{xx2}$ for the roll angle index significantly above 1. The transition between the two values is gradual. As indicated earlier, the term corresponding to the restoring moment due to gravity force can be neglected without significant performance deterioration. Finally, the roll angular acceleration term is computed from equation (11). Typical relationships between the roll angle index and the multipliers $\eta$ and $\epsilon$ and the moment of inertia, are illustrated in FIGS. 14, 15 and 16.

At step 205 the observer gains are computed as functions of the magnitude of lateral acceleration and roll angle index. First, the magnitude of measured lateral acceleration, $|a_{ym}|$, is passed through a slew filter, which limits the falling rate to about 4 m/s³, yielding $|a_{ymf}|$. Then the first multiplying factor is computed as:

$$f_{mult1} = \max(1, ((|a_{ym}| - 0.5) * 2) \quad (20)$$

The second multiplier, $f_{mult2}$, is then determined as a function of roll angle index from a look-up table. This relationship is the same as for the observer designed for the first sensor set and is shown in FIG. 9. The multiplier is equal to one when the index is significantly below one and drops gradually to zero as the index increases beyond 1. The proportional gain is then calculated as in equation 17:

$$g_p = g_{po} * f_{mult1} * f_{mult2}$$

The differential gain, $g_d$, is subsequently calculated as a square root of the proportional gain:

$$g_d = g_p^{1/2} \qquad (21)$$

In this way the damping ratio of the observer, which is a 2-nd order system, is maintained at the same level, regardless of the changes in the proportional gain. A typical value of the gain $g_{po}$ is 20.

At step 206, the observer equation (13) is solved, yielding the final estimates of roll angle and roll rate, $\phi_e$ and $d\phi_e/dt$, the latter being derived by differentiating the former.

When the final estimates of roll angle and roll rate are determined, by any of the methods described above, they can be used as inputs to a lookup table in which are stored probability or likelihood values of rollover, the values being calibrated for a particular vehicle and particular combinations of roll angle and roll rate.

Reducing the Likelihood of Rollover—Roll Control

Figure 23:
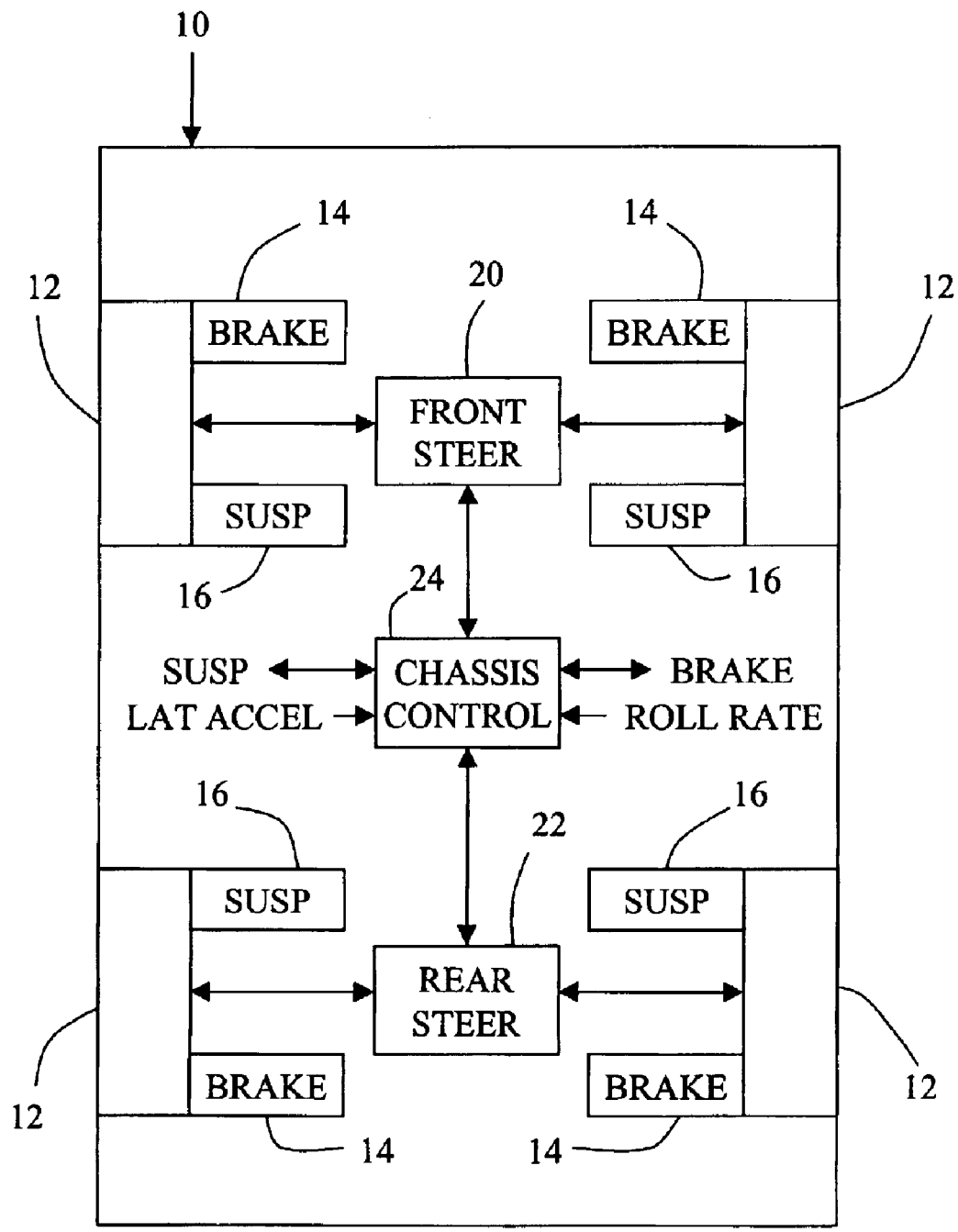
FIG. 23 depicts a block diagram of a vehicle having a roll prediction system and an anti-roll control.

FIG. 23 shows a block diagram of a motor vehicle having a body 10 and wheels 12. Each wheel is equipped with brake apparatus 14 and supports a corner of the body 10 with a suspension apparatus 16, which may include a suspension relative displacement sensor providing an output signal of relative vertical body/wheel position. Either or both of a front steer apparatus 20 and a rear steer apparatus 22 may be controlled by a chassis control 24, which may further control brakes 14 and/or suspension actuators in suspension apparatus 16. Control 24 may further receive signals LAT ACCEL from a vehicle lateral acceleration sensor and ROLL RATE from a vehicle roll rate sensor, neither of which sensors is shown. Chassis control 24 comprises a microcomputer programmed to perform selected ones of the processes described herein and may receive and/or output additional signals from/to additional apparatus not shown but known in the art for the accomplishment of such performance.

Figure 17:
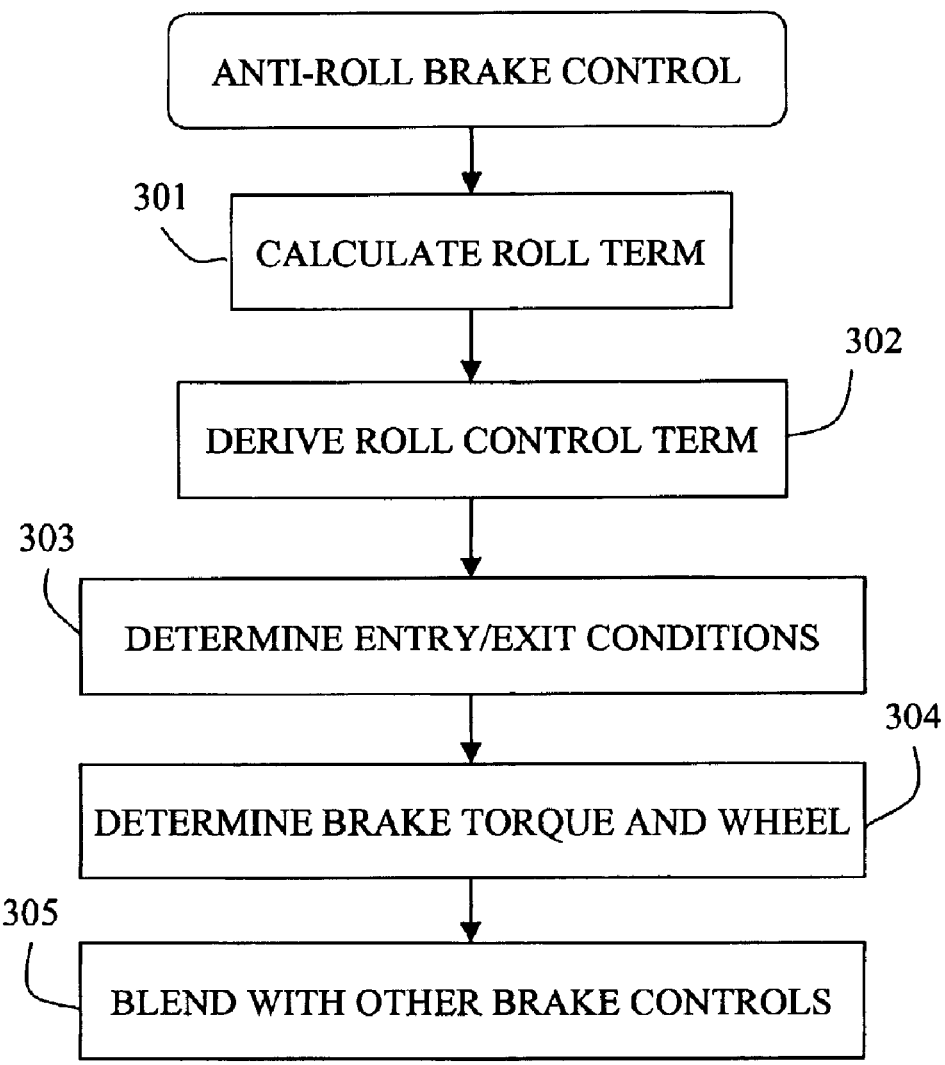
FIG. 17 depicts a flow chart of an anti-roll brake control.

FIG. 17 describes a control algorithm developed to reduce the danger of vehicle rollover. The general idea is to first detect the danger of rollover using the measured and estimated variables, and then to apply brakes (to one side of vehicle) or steering in order to "steer" the vehicle in the direction of vehicle roll. This should either reduce the lateral inertial force or generate the inertial force in the direction opposite to the direction of vehicle roll, thereby reducing the probability of rollover or at least reducing the severity of rollover accident. The algorithm consists of the following steps.

At step 301, the routine calculates the following Roll_Term using measured and estimated variables:

$$\text{Roll\_Term} = a_{ym}/A_{ymax} - \phi_e/\phi_{max} - \qquad (22)$$

$$(\omega_{mc} + k * d\omega_{mc}/dt)/\omega_{max} -$$

$$[|v_{ye}| - v_{ymax}] * \text{sign}(v_{ye})/v_{ymax}$$

Here $a_{ym}$ is measured (and filtered) lateral acceleration, $\phi_e$ is the estimated roll angle (with respect to the road), $\omega_{mc}$ is the measured and centered roll rate (in the case of using the suspension sensor set with $\omega_{mc}$ replaced by the final estimate of roll rate $d\phi_e/dt$), $d\omega_{mc}/dt$ is the roll acceleration (obtained by differentiating, or in practice high pass filtering of, roll rate centered as known to those skilled in the art), $v_{ye}$ is the estimated lateral velocity. The parameter $A_{ymax}$ is a constant representing the maximum lateral acceleration that vehicle can generate on dry, flat surface (e.g. about 7.5 m/s² for an SUV), $\phi_{max}$ is another constant representing the maximum roll angle of vehicle in normal operation (e.g. about 0.13 radians for an SUV), $\phi_{max}$ is the maximum roll rate experienced in normal operation (typically about 1.1 radian/s), the parameter k is a non-negative constant with a typical value of 0.05, $v_{ymax}$ is the maximum lateral velocity, which may correspond to the critical sliding velocity (about 4–5 m/s for an SUV). The critical sliding velocity is the minimum velocity of sliding, which is necessary to rollover vehicle by tripping. The parameters $1/A_{ymax}$, $1/\phi_{max}$, $1/\omega_{max}$ and $1/v_{ymax}$ can also be regarded as tuning parameters, which may be fine tuned through vehicle testing. In the above expression SAE sign convention is used. Thus in the right turn the lateral acceleration is positive, the roll angle is negative and lateral velocity is positive when the velocity vector points to the right. The last term in equation (1) is optional and is used only when the lateral velocity estimate is available.

At step 302, the routine determines the Roll_Control_Term by processing the Roll_Term as follows. First, place a dead-band on the Roll_Term as follows:

$$\text{Roll\_Term\_Dead} = \begin{cases} 0 & \text{when } |\text{Roll\_Term}| \leq \text{RT\_Dead} \\ (|\text{Roll\_Term}| - \text{RT\_Dead}) * \text{sign}(\text{Roll\_Term}) & \text{otherwise} \end{cases} \qquad (23)$$

This reduces the magnitude of Roll_Term by RT_Dead, while preserving the sign. A typical value of RT_Dead is about 1.8. The rate of change in the magnitude of RT_Dead is subsequently limited. The rate of increase is limited to a large number, e.g 100 and the rate of falling to a much smaller value, e.g. 4. As a result the Roll_Control_Term is obtained.

$$\text{Roll\_Control\_Term} = (\text{Roll\_Term\_Dead})_{RATE\_LIMITED} \qquad (24)$$

The Roll_Control_Term can be interpreted as being indicative of rollover danger. During normal driving lateral acceleration, roll angle and roll rate are much smaller then the corresponding maximum values, so the Roll_Term assumes moderate values, typically below 1.5. Consequently, the Roll_Control_Term is zero. During a limit cornering maneuver, both lateral acceleration and roll angle may approach the corresponding limit values, and the magnitude of Roll_Term may approach or even exceed 2, in which case the Roll_Control Term will not be zero. When the lateral acceleration is small, the Roll_Term can still become large in magnitude when the roll angle, roll rate or a combination of them becomes large. This may occur when rollover danger is primarily introduced by (vertical) road inputs. In addition, the lateral velocity term, if the estimate of it is available, contributes to the Roll_Term when the vehicle experiences significant lateral sliding in the direction of vehicle roll or lateral acceleration. This is because lateral velocity in excess of critical sliding velocity makes vehicle susceptible to tripped rollover (if a discontinuity in the surface that may introduce a tripping mechanism is encountered). Overall, the Roll_Term includes all the important factors contributing to a possible rollover. Thus during maneuvers in which the rollover danger occurs, the magnitude of Roll_Term will be larger than about 2 and the magnitude of Roll_Control_Term will be greater then zero. If an estimate of lateral velocity is not available, then a low passed version of a function of the steering angle, the derivative of the steering angle and speed can be used. This indicates that the driver inputs too large a steering angle and steering rate for a given speed; this indicator can either be included in the Roll_Term or used to affect the entry conditions.

In general, the larger the magnitude of Roll_Control_Term, the larger the rollover danger and the stronger the control action necessary to prevent the rollover. Thus the magnitude of control input necessary to counter the rollover is proportional to the Roll_Control_Term. The sign of Roll_Control_Term indicates in which direction the vehicle may (or is about to) rollover and therefore indicates in which direction the vehicle should be steered in order to reduce the danger of rollover.

At step 303 the routine determines the entry/exit conditions. These conditions are as follows. If |Roll_Control_Term|>Entry_Thre, the roll control system is activated. If |Roll_Control_Term|<Exit_Thre, the system is turned off. The typical values of Entry_Thre and Exit_Thre are 0.2 and 0.01, respectively. These conditions essentially represent a relay designed to eliminate chattering in control. In addition the system can be activated only above a certain threshold speed, which is in order of 5 m/s.

At step 304, the routine calculates a corrective brake torque as:

$$T\_brake = Gain\_Br * |Roll\_Control\_Term| \qquad (25)$$

where Gain_Br is a control gain, which may be speed dependent. The commanded brake torque is applied to the left front wheel when the sign of the Roll_Control_Term is positive and to the right front wheel when the sign of the Roll_Control_Term is negative. If the driver is braking, then the corrective brake torque, T_brake is added to the brake command resulting from the driver braking. Although the brake torque is used here as a control variable, it will become obvious to those skilled in art that other variables, such as brake slip or the difference in wheel speeds between the left and right wheels could be used instead, with a gain properly modified.

The vehicle may be equipped with other brake control algorithms, such as ABS (Anti-Lock Braking) or VSE (Vehicle Stability Enhancement). In the case of VSE, at step 305 the routine adds the corrective brake torque commanded by rollover algorithm to the brake torque commanded by VSE algorithm. If the VSE system commands application of brakes to the inside rear wheel (because, for example it recognized the situation as understeer condition), but the rollover control algorithm commands braking of the outside front wheel, then the VSE command is overridden when the rollover danger is large. In this case VSE and rollover algorithms are in conflict and the command from the rollover algorithm is selected in the interest of safety. Similarly, when the rollover danger is large, then the target slip for the ABS algorithm for the wheel to which the rollover algorithm commands application of brakes is increased by a positive value, for example 0.5. Effectively then, the ABS algorithm is prevented from releasing brakes until the wheel slip is large (and possibly even then the wheel may be allowed to lock). This is done in an effort to reduce the lateral acceleration that contributes to rollover danger. The rollover danger is recognized as large when the brake torque commanded by the rollover algorithm, T_brake, exceeds a threshold value (for example 1000 Nm), or when the Roll_Control_Term exceeds certain value (for example, 0.4).

Rollover prevention algorithm can also be used on a vehicle equipped with active front or rear steering. The algorithm described above must be modified, due to two fundamental differences that exist between the braking and steering system control that are relevant to rollover prevention. They are related to the effect of brake and steering correction on lateral acceleration of vehicle. These differences are the following.

Figure 18:
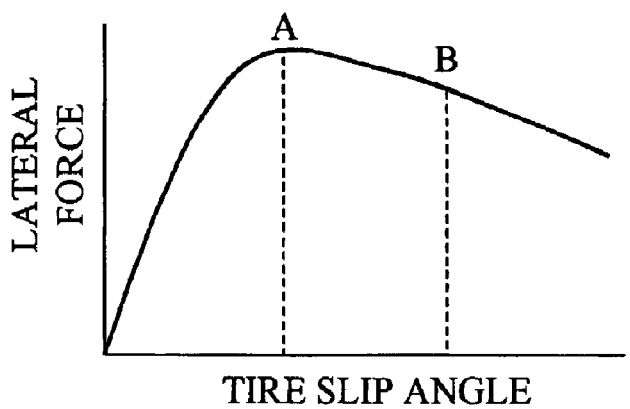
FIG. 18 depicts lateral force as a function of tire slip angle.

The effectiveness of steering correction depends largely on the operating point of the tires, in particular on the tire slip angle. A typical characteristic of the lateral force, as a function of the tire slip angle is shown in FIG. 18. In the linear range the tire force is approximately proportional to the side slip angle, but later it saturates and for large slip angles it decreases slightly (on most surfaces). The slip angle of the tire can be affected by steering correction. In the linear range, reducing the steering angle reduces the slip angle and yields a nearly proportional reduction in the lateral force. When the tire is at the limit, however, small changes in the steering (and slip) angle have almost no effect on the lateral force. In some cases, the lateral force may actually increase when the steering angle is reduced (e.g. from point B to point A), an effect opposite to the desired one. Brake control via braking of outside front wheel does not have this problem because increasing brake force (and wheel slip) of the outside front wheel increases brake force up to about 15% of brake slip, and then reduces the lateral force up to the lock up condition. Thus the lateral acceleration decreases monotonically with increasing brake force.

The effectiveness of steering correction in terms of influence on lateral acceleration increases more sharply with speed than in the case of brake control. For example, in the linear range of tire operation lateral acceleration increases almost as a quadratic function of speed. Therefore, the control gain, relating the commanded change in the steering angle to the Roll_Control_Term, should be a decreasing function of speed.

The first problem is dealt with by adding a feed-forward control term that essentially amounts to limiting the steering angle of the front wheels to a reasonable level in the case of active front steer. Consequently, the slip angle of the front tires is not likely to significantly exceed the value corresponding to the peak lateral force. For the active rear steer, the feed-forward part is modified to improve vehicle stability when vehicle approaches the limit of adhesion. That is, when the front steering angle commanded by the driver becomes unreasonably large for given speed, an additional steering term is added to the rear steer angle, which is in phase with the front steering angle. In addition, feedback control terms are used for both front and rear steering in a way similar to that used for the brake system. The second problem is tackled by shaping the control gains as function of speed differently than in the case of brake control.

Figure 19:
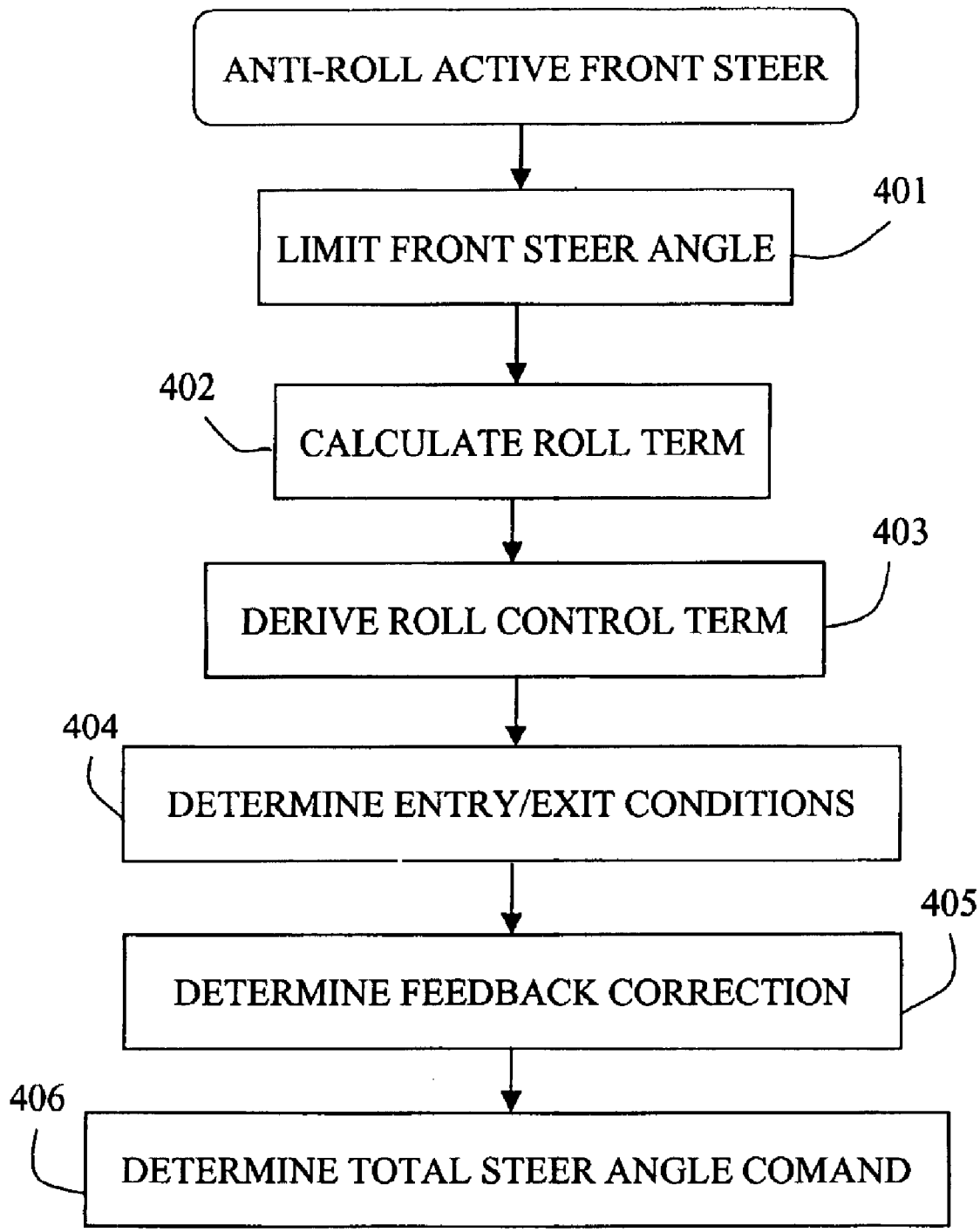
FIG. 19 depicts an anti-roll active front steer control.

The control algorithm for active front steer is described with reference to the flow chart of FIG. 19. At step 401, the routine limits the magnitude of front steering angle to a reasonable value. First, it computes several steering angle values for a given speed as follows:

$$\delta_1 = a_{ylim} * (K_u + L/v_x^2); \; \delta_2 = (1+N_1)*\delta_1; \; \delta_{max} = (1+N_2)*\delta_1 \qquad (26)$$

where $a_{ylim}$ is a constant lateral acceleration (a typical value about 12 m/s²), $K_u$ is an understeer coefficient, L is vehicle wheel-base and $v_x$ is vehicle speed, $N_1$ is a positive constant (an example value 1.0) and $N_2$ is another non-negative constant that is smaller than $N_1$ (an example value is 0.2). At any speed the steering angle $\delta_1(v_x)$ should be just sufficient to reach the maximum lateral acceleration the vehicle is capable of in a steady state turn.

Then limit the steering angle of the front wheels as follows:

$$\delta_{lim} = \begin{cases} \delta & \text{when } |\delta| \leq \delta_1 \\ \delta_1 + (N_2\delta_1)*(|\delta|-\delta_1)*\text{sign}(\delta)/(\delta_2-\delta_1) & \text{when } \delta_1 < \delta < \delta_2 \\ \delta_{max}*\text{sign}(\delta) & \text{when } |\delta| \geq \delta_2 \end{cases} \quad (27)$$

Figure 20:
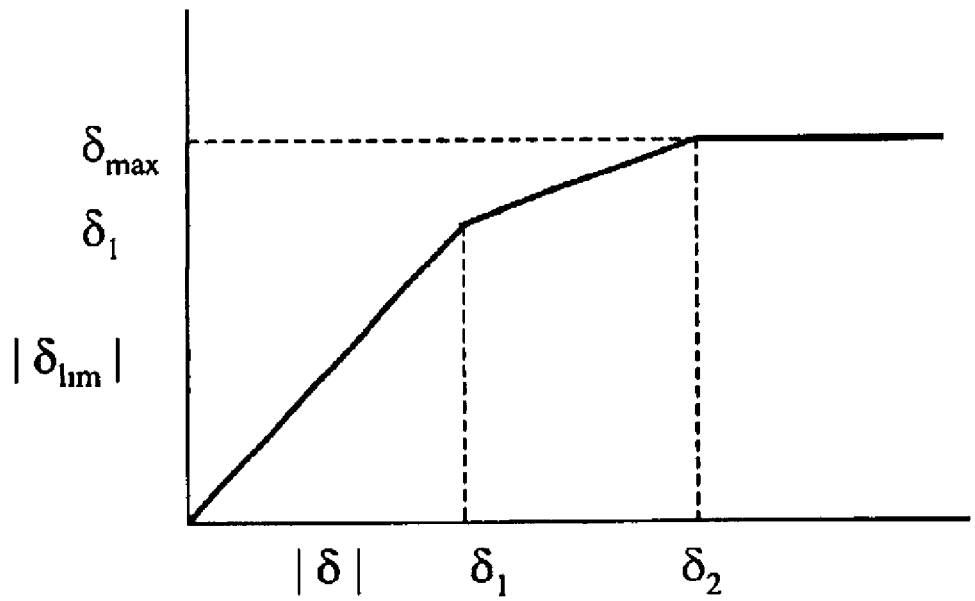
FIG. 20 depicts limitation of front steering angle in the anti-roll active front steer control process of FIG. 19.

In the above, $\delta$ represents the front steering angle commanded by the driver and $\delta_{lim}$ is the limited steering angle. This limitation is illustrated in FIG. 20. It is initially a soft limitation followed by a hard one when the steering angle is much too large for a given speed.

Steps 402, 403 and 404 calculate the Roll_Term, the Roll_Control_Term and the Entry/Exit conditions, respectively, as described above with respect to steps 301, 302 and 303 of the brake control algorithm of FIG. 17; and the description need not be repeated.

At step 405, the routine calculates a feedback correction of the front steering angle as follows:

$$\delta_{fb} = -\text{Gain\_FrSteer}*\text{Roll\_Control\_Term} \quad (28)$$

where Gain_FrSteer is a control gain that is always positive and is a decreasing function of speed. Positive steering angle corresponds to steering right (clockwise).

At step 406, the routine calculates the total commanded steering angle as follows:

$$\delta_{tot} = \delta_{lim} = \delta_{fb} \quad (29)$$

The steering angle $\delta_{tot}$ is the commanded steering angle to the front wheel actuator.

Figure 22:
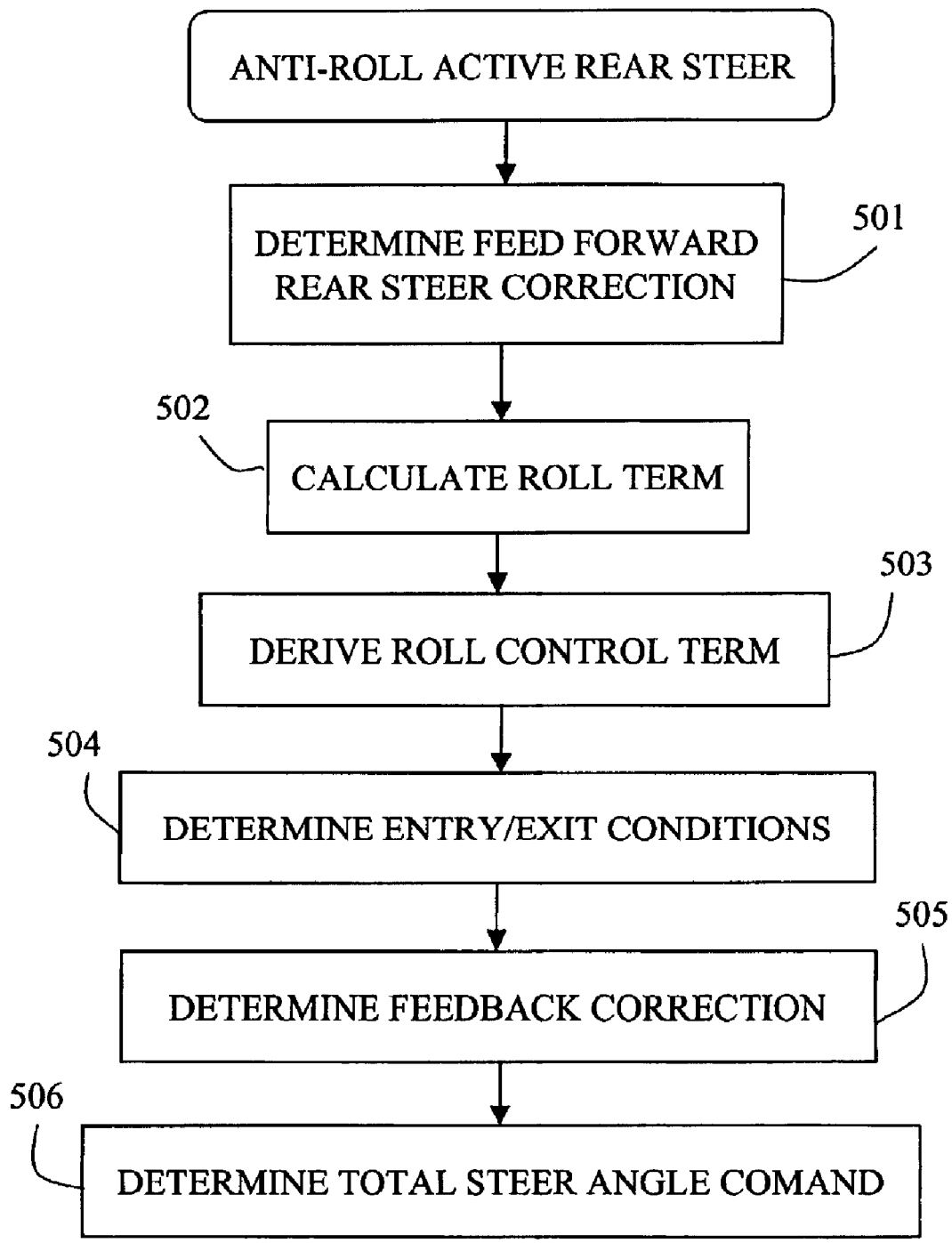
FIG. 22 depicts an anti-roll active rear steer control.

The algorithm for the active rear steer system is described with reference to the flow chart of FIG. 22. It is assumed here that the feed-forward control gain (the ratio between the rear and front steering angles) is a function of vehicle speed only, as is typically the case for active rear steer systems. If the gain is a function of both the speed and the front steering angle, then the first step may be eliminated.

At step 501, the routine adds a rear steering correction in phase with the front steering angle when the front steering angle is large for the given speed. First it determines the following two steering angles:

$$\delta_1 = a_{y1}*(K_u = L/v_x^2); \delta_2 = N*\delta_1 \quad (30)$$

where $a_{y1}$ is a constant lateral acceleration (for example, 8 m/s$^2$), L is vehicle wheel-base, $K_u$ is an understeer coefficient and N is a constant (an example value N=2). Denote by $\Delta\delta_{rffmax}$ the maximum acceptable feed-forward steering correction of the rear wheels (an example value is 0.06 radians). Let $\delta_f$ be the front wheel steering angle and $\delta_{rff}$ the normally used feed-forward part of the rear steering angle (equal to the front steering angle times the speed-dependent feed-forward gain). Then the feed-forward rear steering angle correction is as follows (equation 31):

$$\Delta\delta_{rff} = \begin{cases} 0 & \text{when } |\delta_f - \delta_{rff}| \leq \delta_1 \\ [(|\delta_f - \delta_{rff}| - \delta_1)*\text{sign}(\delta_f - \delta_{rff})/(\delta_2 - \delta_1)]*\Delta\delta_{rffmax} & \text{when } \delta_1 < |\delta_f - \delta_{rff}| < \delta_2 \\ \Delta\delta_{rffmax}*\text{sign}(\delta_f - \delta_{rff}) & \text{when } |\delta_f - \delta_{rff}| \geq \delta_2 \end{cases} \quad (31)$$

Figure 21:
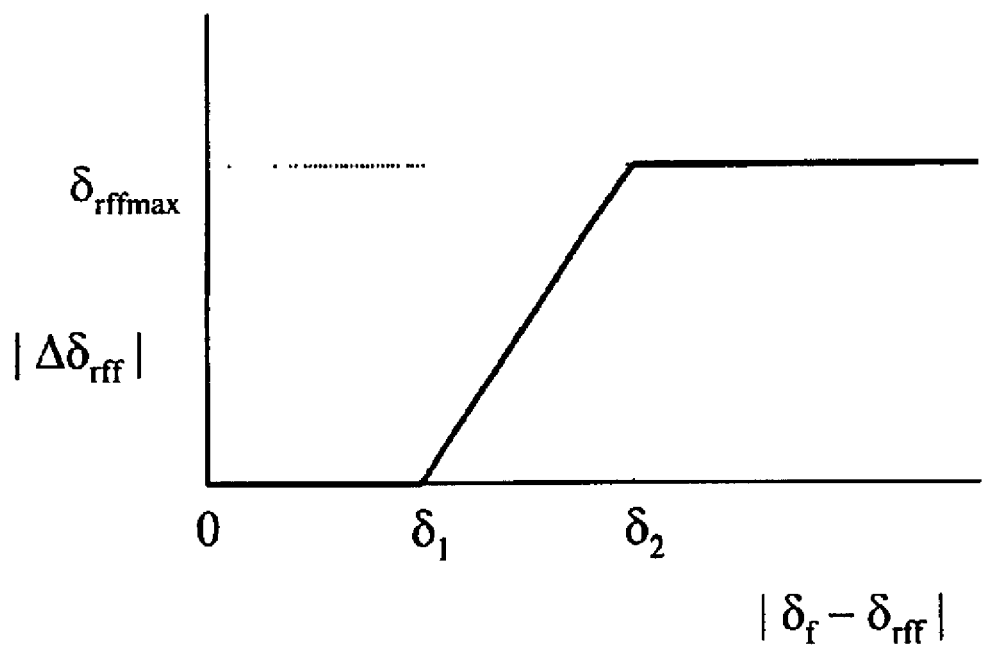
FIG. 21 depicts feed-forward correction of rear steer angle in the anti-roll active rear steer control of FIG. 22.

This correction, shown graphically in FIG. 21 as a function of $|\delta_f - \delta_{rff}|$, introduces a desirable progressive understeer at the limit.

Steps 502, 503 and 504 calculate the Roll_Term, the Roll_Control_Term and the Entry/Exit conditions, respectively, as described above with respect to steps 301, 302 and 303 of the brake control algorithm of FIG. 17; and the description need not be repeated.

At step 505, the routine calculates a feedback correction of the rear steering angle as follows:

$$\Delta\delta_{rfb} = \text{Gain\_ReSteer}*\text{Roll\_Control\_Term} \quad (32)$$

where Gain_ReSteer is a control gain that is always positive and is a decreasing function of speed. Positive steering angle corresponds to steering right (clockwise).

At step 506, the routine calculates the total commanded rear steering angle as follows:

$$\delta_{rtot} = \delta_{rff} + \Delta\delta_{rff} + \Delta\delta_{rfb} \quad (33)$$

The steering angle $\delta_{rtot}$ is the target steering angle for the rear steer controller, which is implemented in a way known from prior art.

What is claimed is:

1. Method for determining likelihood of rollover of a vehicle comprising the steps:

measuring vehicle lateral acceleration;

measuring one of vehicle roll rate and vehicle suspension displacements;

from the measured lateral acceleration and the measured one of the vehicle roll rate and the vehicle suspension displacements, deriving a first estimate of roll angle and a first estimate of roll rate;

storing a dynamic, closed loop observer equation comprising a model of the vehicle in a first roll mode for roll angles small compared to a reference value indicating two wheel lift-off and a second roll mode for roll angles at least near the reference value indicating two wheel lift-off, the observer equation having a plurality of terms with coefficients;

deriving a roll angle index from at least the measured lateral acceleration and the measured one of vehicle roll rate and vehicle suspension displacements;

storing values of the coefficients of selected ones of the plurality of terms of the observer equation as functions of the roll angle index, the stored coefficients for each of the selected ones of the plurality of terms having at least a first value corresponding to the first roll mode and a second value corresponding to the second roll mode;

deriving a second estimate of roll angle from the observer equation using one of the first values of the stored coefficients and the second values of the stored coefficients based on the derived roll angle index; and determining the likelihood of vehicle roll-over at least in response to the second estimate of roll angle.

2. The method of claim 1 further comprising the step of deriving a second estimate of roll rate from the observer equation using the one of the first values of the stored coefficients and the second values of the stored coefficients based on the derived roll angle index and wherein the likelihood of vehicle roll-over is further determined in response to the second estimate of roll rate.

3. The method of claim 1 wherein:
the measured one of the vehicle roll rate and the vehicle suspension displacements is the vehicle roll rate and the step of deriving the first estimate of roll rate further comprises the steps:
deriving a measured and centered roll rate by removing effects of slowly changing bank angle of the road and sensor bias from the measured vehicle roll rate and deriving the first estimate of roll rate from the measured and centered roll rate.

4. The method of claim 3 wherein the effects of slowly changing bank angle of the road and sensor bias are removed from the measured vehicle roll rate in the following steps:
deriving a preliminary estimate of roll angle from the measured vehicle lateral acceleration;
from the preliminary estimate of roll angle from lateral acceleration, deriving a preliminary estimate of roll rate from lateral acceleration;
deriving a roll rate error value representing the effect of sensor bias and slowly changing bank angle from the lateral acceleration derived roll rate and the measured roll rate; and
deriving a measured and centered roll rate, substantially free of the effects of slowly changing bank angle of the road and sensor bias, from a difference between the measured vehicle roll rate and the roll rate error.

5. The method of claim 4 wherein the roll rate error is derived by limiting and low pass filtering a difference between the preliminary estimate of roll rate from lateral acceleration and the measured vehicle roll rate.

6. The method of claim 1 wherein the measured one of the vehicle roll rate and the vehicle suspension displacements is the vehicle roll rate and the step of deriving a first estimate of roll angle further comprises the steps:
deriving a preliminary estimate of roll angle from the measured lateral acceleration;
deriving a preliminary estimate of roll angle from the measured vehicle roll rate;
deriving a weighting factor from the measured vehicle roll rate; and
deriving the first estimate of roll angle as a weighted sum of the preliminary estimate of roll angle derived from the measured lateral acceleration and the preliminary estimate of roll angle derived from the measured vehicle roll rate using a value of the stored weighting factor determined by the measured vehicle roll rate, the weighting factor providing greater weight to the preliminary estimate of roll angle derived from the measured lateral acceleration at small values of the measured vehicle roll rate and greater weight to the preliminary estimate of roll angle derived from the measured vehicle roll rate at larger values of the measured roll rate.

7. The method of claim 5 wherein the roll angle index is derived from an absolute maximum of at least (1) the ratio of the preliminary estimate of roll angle derived from the measured lateral acceleration to the reference angle indicating two wheel lift-off and (2) a composite linear combination of at least the ratio of the preliminary estimate of roll angle derived from the measured vehicle roll rate to the reference angle indicating two wheel lift-off and the ratio of the measured lateral acceleration to a maximum lateral acceleration sustainable on a dry surface.

8. The method of claim 7 wherein the composite linear combination further comprises a ratio of measured and centered roll rate to a predetermined maximum roll rate value.

9. The method of claim 1 wherein:
the measured one of the vehicle roll rate and the vehicle suspension displacements is the vehicle suspension displacements.

10. The method of claim 9 wherein:
a preliminary estimate of roll angle is derived from the measured vehicle suspension displacements; and
the roll angle index is derived from the absolute maximum of (1) the ratio of the measured lateral acceleration to a maximum lateral acceleration sustainable on a dry surface and (2) the ratio of the preliminary roll angle is derived from the measured vehicle suspension displacements to the reference angle indicating two wheel lift-off.

11. The method of claim 9 wherein the first estimate of roll rate is derived from the first estimate of roll angle.

12. The method of claim 9 wherein the second estimate of roll rate is derived from the second estimate of roll angle.

13. Apparatus for determining likelihood of rollover of a vehicle comprising:
means for measuring vehicle lateral acceleration;
means for measuring one of vehicle roll rate and vehicle suspension displacements;
means responsive to the measured lateral acceleration and the measured one of the vehicle roll rate and the vehicle suspension displacements for deriving a first estimate of roll angle and a first estimate of roll rate;
means for storing a dynamic, closed loop observer equation comprising a model of the vehicle in a first roll mode for roll angles small compared to a reference value indicating two wheel lift-off and a second roll mode for roll angles at least near the reference value indicating two wheel lift-off, the observer equation having a plurality of terms with coefficients;
means for deriving a roll angle index from at least the measured lateral acceleration and the measured one of vehicle roll rate and vehicle suspension displacements;
means for storing values of the coefficients of selected ones of the plurality of terms of the observer equation as functions of the roll angle index, the stored coefficients for each of the selected ones of the plurality of terms having at least a first value corresponding to the first roll mode and a second value corresponding to the second roll mode;
means for deriving, a second estimate of roll angle from the observer equation using one of the first values of the stored coefficients and the second values of the stored coefficients based on the derived roll angle index; and means for determining the likelihood of vehicle roll-over at least in response to the second estimate of roll angle.

14. The apparatus of claim 13 further comprising means for deriving a second estimate of roll rate from the observer equation using the one of the first values of the stored coefficients and the second values of the stored coefficients based on the derived roll angle index and means for further determining the likelihood of vehicle roll-over in response to the second estimate of roll rate.

15. The apparatus of claim 13 wherein the measured one of the vehicle roll rate and the vehicle suspension displacements is the vehicle roll rate and the means for deriving the first estimate of roll rate further comprises means for deriving a measured and centered roll rate by removing effects of slowly changing bank angle of the road and sensor bias from the measured vehicle roll rate and deriving the first estimate of roll rate from the measured and centered roll rate.

16. The apparatus of claim 15 further comprising:
means for deriving a preliminary estimate of roll angle from the measured vehicle lateral acceleration;
means responsive to the preliminary estimate of roll angle from lateral acceleration for deriving a preliminary estimate of roll rate from lateral acceleration;
means for deriving a roll rate error value representing the effect of sensor bias and slowly changing bank angle from the lateral acceleration derived roll rate and the measured roll rate; and
means for deriving a measured and centered roll rate, substantially free of the effects of slowly changing bank angle of the road and sensor bias, from a difference between the measured vehicle roll rate and the roll rate error.

17. The apparatus of claim 16 wherein the means for deriving the roll rate error further comprises means for limiting and low pass filtering a difference between the preliminary estimate of roll rate from lateral acceleration and the measured vehicle roll rate.

18. The apparatus of claim 13 wherein the measured one of the vehicle roll rate and the vehicle suspension displacements is the vehicle roll rate and the means for deriving a first estimate of roll angle further comprises:
means for deriving a preliminary estimate of roll angle from the measured lateral acceleration;
means for deriving a preliminary estimate of roll angle from the measured vehicle roll rate;
means for deriving a weighting factor from the measured vehicle roll rate; and
means for deriving the first estimate of roll angle as a weighted sum of the preliminary estimate of roll angle derived from the measured lateral acceleration and the preliminary estimate of roll angle derived from the measured vehicle roll rate using a value of the stored weighting factor determined by the measured vehicle roll rate, the weighting factor providing greater weight to the preliminary estimate of roll angle derived from the measured lateral acceleration at small values of the measured vehicle roll rate and greater weight to the preliminary estimate of roll angle derived from the measured vehicle roll rate at larger values of the measured roll rate.

19. The apparatus of claim 17 comprising means for deriving the roll angle index from an absolute maximum of at least (1) the ratio of the preliminary estimate of roll angle derived from the measured lateral acceleration to the reference angle indicating two wheel lift-off and (2) a composite linear combination of at least the ratio of the preliminary estimate of roll angle derived from the measured vehicle roll rate to the reference angle indicating two wheel lift-off and the ratio of the measured lateral acceleration to a maximum lateral acceleration sustainable on a dry surface.

20. The apparatus of claim 19 wherein the composite linear combination further comprises a ratio of measured and centered roll rate to a predetermined maximum roll rate value.

21. The apparatus of claim 13 wherein the measured one of the vehicle roll rate and the vehicle suspension displacements is the vehicle suspension displacements.

22. The apparatus of claim 21 further comprising:
means for deriving a preliminary estimate of roll angle from the measured vehicle suspension displacements; and
means for deriving the roll angle index from the absolute maximum of (1) the ratio of the measured lateral acceleration to a maximum lateral acceleration sustainable on a dry surface and (2) the ratio of the preliminary roll angle derived from the measured vehicle suspension displacements to the reference angle indicating two wheel lift-off.

23. The apparatus of claim 21 further comprising means for deriving the first estimate of roll rate from the first estimate of roll angle.

24. The apparatus of claim 21 further comprising means for deriving the second estimate of roll rate from the second estimate of roll angle.

* * * * *